(12) United States Patent
Bito et al.

(10) Patent No.: US 7,684,117 B2
(45) Date of Patent: *Mar. 23, 2010

(54) ZOOM LENS SYSTEM, IMAGING DEVICE AND CAMERA

(75) Inventors: Takakazu Bito, Osaka (JP); Keiki Yoshitsugu, Hyogo (JP)

(73) Assignee: Panasonic Corporation, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/253,081

(22) Filed: Oct. 16, 2008

(65) Prior Publication Data

US 2009/0141350 A1    Jun. 4, 2009

Related U.S. Application Data

(62) Division of application No. 11/600,066, filed on Nov. 16, 2006, now Pat. No. 7,471,453.

(30) Foreign Application Priority Data

Nov. 17, 2005    (JP)    ............... 2005-333161

(51) Int. Cl.
G02B 27/64    (2006.01)
G02B 15/14    (2006.01)

(52) U.S. Cl. .................. 359/557; 359/684; 359/686

(58) Field of Classification Search ............... 359/554, 359/555, 557, 680, 682, 684, 686, 687, 689

See application file for complete search history.

(56) References Cited

U.S. PATENT DOCUMENTS

| 7,218,455 | B2 | 5/2007 | Iwasawa |
| 7,312,934 | B2 | 12/2007 | Iwasawa |
| 7,471,453 | B2 * | 12/2008 | Bito et al. .................. 359/557 |
| 2003/0156832 | A1 | 8/2003 | Nomura et al. |
| 2003/0161620 | A1 | 8/2003 | Hagimori et al. |
| 2004/0080656 | A1 | 4/2004 | Higuchi et al. |
| 2005/0036777 | A1 | 2/2005 | Nomura et al. |
| 2007/0031134 | A1 | 2/2007 | Kuroda et al. |

FOREIGN PATENT DOCUMENTS

| EP | 1 630 584 A1 | 3/2006 |
| JP | 11-196303 A | 7/1999 |
| JP | 11-258678 A | 9/1999 |
| JP | 2003-156789 A | 5/2003 |

(Continued)

OTHER PUBLICATIONS

United States Office Action issued in U.S. Appl. No. 12/253,093 mailed Sep. 24, 2009.

*Primary Examiner*—David N Spector
(74) *Attorney, Agent, or Firm*—McDermott Will & Emery LLP

(57) ABSTRACT

A zoom lens system comprising a plurality of lens units each composed of at least one lens element, wherein an interval between at least any two lens units among the lens units is changed so that an optical image of an object is formed with a continuously variable magnification, a first lens unit arranged on the most object side among the lens units includes a lens element having a reflecting surface for bending a light beam from the object, and any one of the lens units, any one of the lens elements, or alternatively a plurality of adjacent lens elements that constitute one lens unit move in a direction perpendicular to an optical axis; an imaging device including the zoom lens system; and a camera employing the imaging device.

26 Claims, 16 Drawing Sheets

FOREIGN PATENT DOCUMENTS

| | | |
|---|---|---|
| JP | 2003-169236 A | 6/2003 |
| JP | 2003-202500 A | 7/2003 |
| JP | 2003-315861 A | 11/2003 |
| JP | 2004-102089 A | 4/2004 |
| JP | 2004-118101 A | 4/2004 |
| JP | 2004-354869 A | 12/2004 |

* cited by examiner

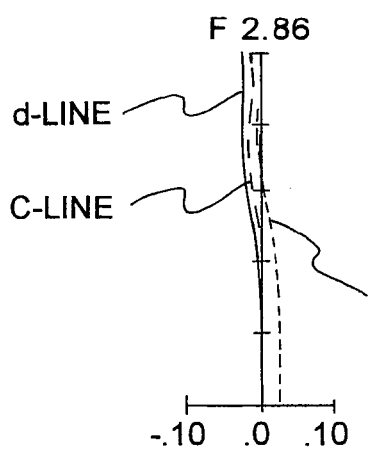
FIG. 3A F 2.86
d-LINE, C-LINE, F-LINE
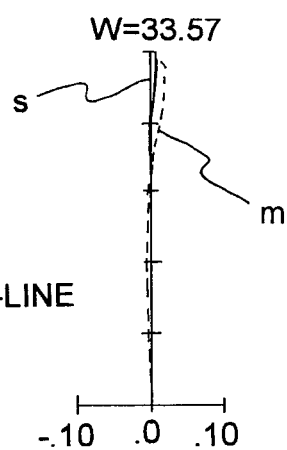
FIG. 3B W=33.57
s, m
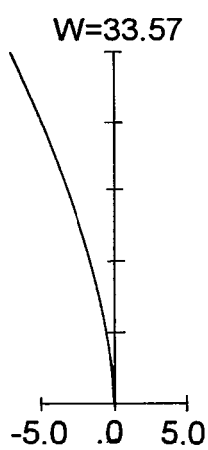
FIG. 3C W=33.57
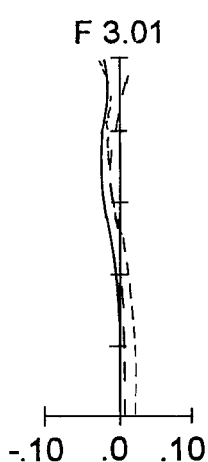
FIG. 3D F 3.01
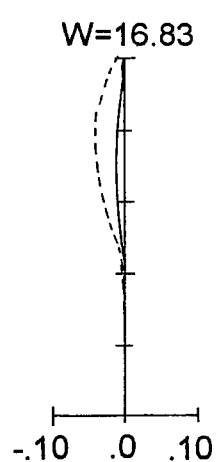
FIG. 3E W=16.83
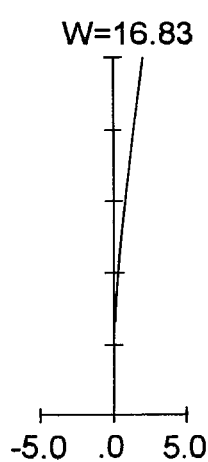
FIG. 3F W=16.83
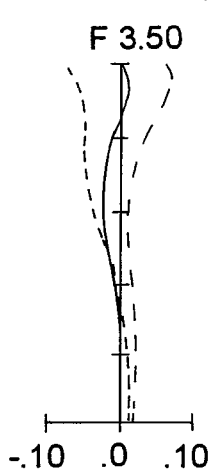
FIG. 3G F 3.50
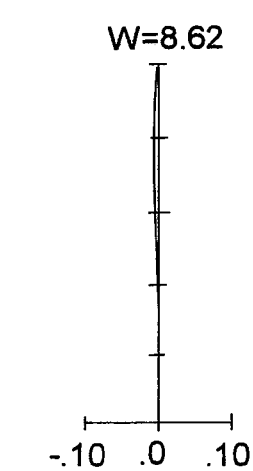
FIG. 3H W=8.62
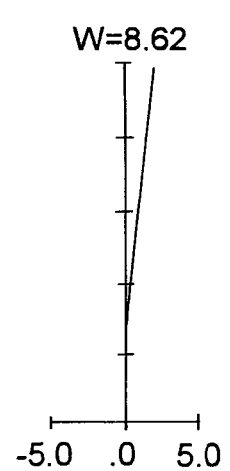
FIG. 3I W=8.62
SPHERICAL ABERRATION (mm)    ASTIGMATISM (mm)    DISTORTION (%)

F 2.82 d-LINE
F-LINE
C-LINE

W=32.89 m
s

W=32.89

F 3.14

W=17.38

W=17.38

F 3.84

W=8.77

W=8.77

SPHERICAL ABERRATION (mm)    ASTIGMATISM (mm)    DISTORTION (%)

F 2.83 d-LINE
F-LINE
C-LINE

W=33.05 m
s

W=33.05

−.10  .0  .10          −.10  .0  .10          −5.0  .0  5.0

F 3.24

W=17.58

W=17.58

−.10  .0  .10          −.10  .0  .10          −5.0  .0  5.0

F 4.16

W=7.30

W=7.30

−.10  .0  .10          −.10  .0  .10          −5.0  .0  5.0

SPHERICAL ABERRATION (mm)   ASTIGMATISM (mm)   DISTORTION (%)

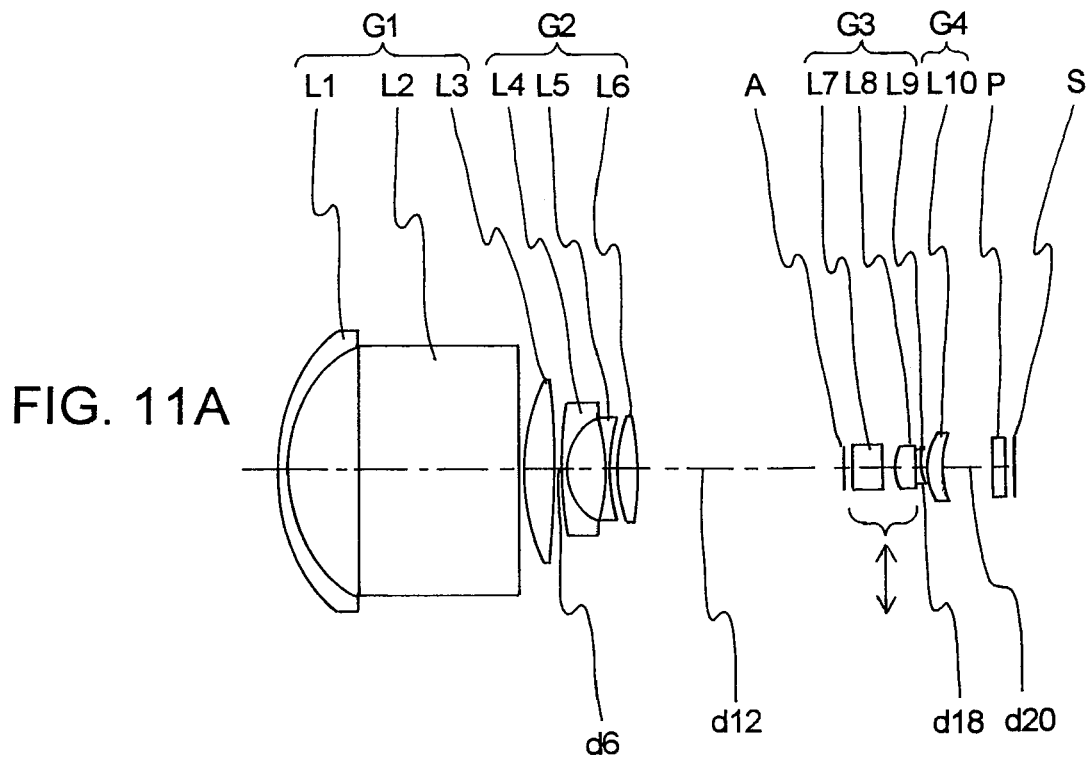
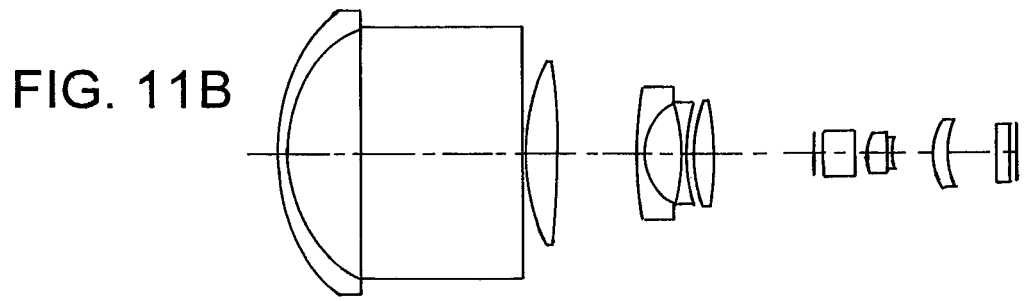
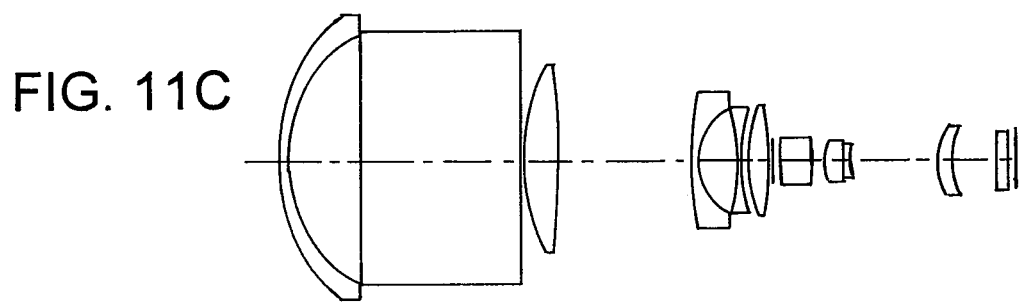

F 2.87

F-LINE
d-LINE
C-LINE

-.10  .0  .10

W=33.45 s
m

-.10  .0  .10

W=33.45

-5.0  .0  5.0

F 3.29

-.10  .0  .10

W=18.01

-.10  .0  .10

W=18.01

-5.0  .0  5.0

F 3.83

-.10  .0  .10

SPHERICAL
ABERRATION (mm)

W=9.17

-.10  .0  .10

ASTIGMATISM (mm)

W=9.17

-5.0  .0  5.0

DISTORTION (%)

F 3.33 d-LINE
F-LINE
C-LINE

W=30.89 s
m

W=30.89

F 4.60

W=19.77

W=19.77

F 6.55

W=11.77

W=11.77

SPHERICAL ABERRATION (mm)   ASTIGMATISM (mm)   DISTORTION (%)

ZOOM LENS SYSTEM, IMAGING DEVICE AND CAMERA

CROSS-REFERENCE TO RELATED APPLICATION

This application is a Divisional of U.S. application Ser. No. 11/600,066, filed Nov. 16, 2006, now U.S. Pat. No. 7,471,453 issued on Dec. 30, 2008, and claims priority of Japanese Application No. 2005-333161 filed in Japan on Nov. 17, 2005, the entire contents of each of which are hereby incorporated by reference.

BACKGROUND

1. Technical Field

The present invention relates to a zoom lens system, an imaging device and a camera. In particular, the present invention relates to: a zoom lens system that is used suitably in a small and high-image quality camera such as a digital still camera or a digital video camera, hence has high resolution, and has a blur compensation function of optically compensating blur caused in an image by hand blur, vibration or the like; an imaging device including this zoom lens system; and a thin compact camera employing this imaging device.

2. Description of the Background Art

With recent progress in the development of solid-state image sensors such as a CCD (Charge Coupled Device) and a CMOS (Complementary Metal-Oxide Semiconductor) having a high pixel, digital still cameras and digital video cameras are rapidly spreading that employ an imaging device including an imaging optical system of high optical performance corresponding to the above solid-state image sensors of a high pixel.

Among these, especially in digital still cameras, thin constructions have recently been proposed in order to achieve satisfactory accommodation property or portability to which the highest priority is imparted. As possible means for realizing such thin digital still cameras, a large number of zoom lens systems for bending a light beam as well as lens barrels and imaging devices employing these systems have been proposed.

For example, Japanese Laid-Open Patent Publication No. H11-258678 discloses a lens barrel comprising: a fixed first stage shooting lens; a plurality of movable shooting lens units arranged in the subsequent stages of the shooting lens; optical axis changing means in the middle of the plurality of movable shooting lens units; and driving means for moving in the shooting optical axis direction the movable shooting lenses located upstream and downstream the optical axis changing means. In this lens barrel disclosed in Japanese Laid-Open Patent Publication No. H11-258678, since the optical axis changing means is arranged in the middle of the plurality of movable shooting lens units, the interval is reduced between the shooting lens of the first stage and the movable shooting lens units of the subsequent stages. This reduces the diameter in the shooting lens of the first stage, and hence reduces the volume of the entire lens barrel.

Further, Japanese Laid-Open Patent Publication No. H11-196303 discloses an electronic imaging device comprising a shooting lens unit that has a plurality of lenses and optical axis changing means arranged between the plurality of lenses and that is arranged on the frontward of the photographic object side of an image display section provided in a rear face of a main body of the device, so that object light having passed through the shooting lens unit is photoelectrically converted and recorded by an image sensor. In this electronic imaging device disclosed in Japanese Laid-Open Patent Publication No. H11-196303, since the shooting lens unit is provided with the optical axis changing means arranged between the lenses, a construction is formed that the light beam is bent in the middle. Further, the image display section is arranged in the rear face. This avoids the main body of the device becomes thick, and realizes a shape of satisfactory balance where the horizontal dimension is reduced.

Furthermore, Japanese Laid-Open Patent Publication No. 2004-354869 discloses a zoom lens system that has a five-unit construction of positive, negative, positive, positive and negative in order from the object side, and that performs zooming by moving a second lens unit and a fourth lens unit, in which a first lens unit, in order from the object side, comprises a negative front side lens unit, an optical member for bending an optical path, and a positive rear side lens unit, and in which the imaging magnification of a fifth lens unit is set within a specific range. In this zoom lens system disclosed in Japanese Laid-Open Patent Publication No. 2004-354869, since the first lens unit comprises the negative front side lens unit, the optical member for bending the optical path, and the positive rear side lens unit, the moving direction of the second lens unit and the fourth lens unit at the time of zooming aligns with the optical axis direction of the rear side lens unit of the first lens unit. This reduces the thickness of the lens system. Further, since the imaging magnification of the fifth lens unit is larger than a specific value, the focal length is reduced in the lenses arranged on the object side thereof. This reduces the overall length of the lens system, and reduces the effective diameter in the front side lens unit and the rear side lens unit of the first lens unit.

Nevertheless, in the lens barrel disclosed in Japanese Laid-Open Patent Publication No. H11-258678, the shooting lens unit that moves in the optical axis direction in zooming is included between the shooting lens of the first stage located on the most object side and the optical axis changing means. Thus, the entire lens barrel is not sufficiently size-reduced. Further, the zoom lens system itself held by the lens barrel is not specified sufficiently, and hence this zoom lens system does not seem to correspond to blur compensation.

Similarly, in the electronic imaging device disclosed in Japanese Laid-Open Patent Publication No. H11-196303, the shooting lens unit itself is not specified sufficiently, and hence this electronic imaging device does not seem to have a sufficient blur compensation function. Further, the lens eyepiece part and the release switch are far apart from each other. This construction easily causes blur in the image owing to hand blur.

Further, in the zoom lens system disclosed in Japanese Laid-Open Patent Publication No. 2004-354869, a specific lens system having a five-unit construction is employed so that thickness reduction is achieved reliably while the overall length is reduced in the lens system. Nevertheless, its blur compensation function is not satisfactory, and has a problem that sufficient optical performance cannot be maintained when blur compensation is performed.

SUMMARY

The present invention has been made in order to resolve the problems in the prior art. An object of the present invention is to provide: a zoom lens system that has a short overall length and hence is thin and compact, that has high resolution, and that has a blur compensation function of optically compensating blur caused in an image by hand blur, vibration or the like; an imaging device including this zoom lens system; and a camera employing this imaging device.

The novel concepts disclosed herein were achieved in order to solve the foregoing problems in the conventional art, and herein is disclosed:

a zoom lens system comprising a plurality of lens units each composed of at least one lens element, wherein an interval between at least any two lens units among the lens units is changed so that an optical image of an object is formed with a continuously variable magnification, a first lens unit arranged on the most object side among the lens units includes a lens element having a reflecting surface for bending a light beam from the object, and any one of the lens units, any one of the lens elements, or alternatively a plurality of adjacent lens elements that constitute one lens unit move in a direction perpendicular to an optical axis.

The novel concepts disclosed herein were achieved in order to solve the foregoing problems in the conventional art, and herein is disclosed:

an imaging device capable of outputting an optical image of an object as an electric image signal, comprising a zoom lens system that forms the optical image of the object and an image sensor that converts the optical image formed by the zoom lens system into the electric image signal, wherein the zoom lens system comprises a plurality of lens units each composed of at least one lens element, in which an interval between at least any two lens units among the lens units is changed so that an optical image of an object is formed with a continuously variable magnification, a first lens unit arranged on the most object side among the lens units includes a lens element having a reflecting surface for bending a light beam from the object, and any one of the lens units, any one of the lens elements, or alternatively a plurality of adjacent lens elements that constitute one lens unit move in a direction perpendicular to an optical axis.

The novel concepts disclosed herein were achieved in order to solve the foregoing problems in the conventional art, and herein is disclosed:

a camera for converting an optical image of an object into an electric image signal and then performing at least one of displaying and storing of the converted image signal, comprising an imaging device including a zoom lens system that forms the optical image of the object and an image sensor that converts the optical image formed by the zoom lens system into the electric image signal, wherein the zoom lens system comprises a plurality of lens units each composed of at least one lens element, in which an interval between at least any two lens units among the lens units is changed so that an optical image of an object is formed with a continuously variable magnification, a first lens unit arranged on the most object side among the lens units includes a lens element having a reflecting surface for bending a light beam from the object, and any one of the lens units, any one of the lens elements, or alternatively a plurality of adjacent lens elements that constitute one lens unit move in a direction perpendicular to an optical axis.

The present invention provides a zoom lens system that has a short overall length and hence is thin and compact, that has high resolution, and that has a blur compensation function of optically compensating blur caused in an image by hand blur, vibration or the like. Further, the present invention provides: a thin imaging device that includes this zoom lens system and that has high resolution and a blur compensation function; and a camera that employs this imaging device and that has a short startup time, dustproof and waterproof properties, and a notably reduced longitudinal dimension.

BRIEF DESCRIPTION OF THE DRAWINGS

This and other objects and features of this invention will become clear from the following description, taken in conjunction with the preferred embodiments with reference to the accompanied drawings in which:

FIGS. 3A to 3I are longitudinal aberration diagrams of a zoom lens system according to Example 1 in an infinity in-focus condition at a wide-angle limit, a middle position and a telephoto limit;

FIGS. 11A to 11C are lens arrangement diagrams showing a zoom lens system according to Embodiment 6 (Example 4) in an infinity in-focus condition at a wide-angle limit, a middle position and a telephoto limit;

DESCRIPTION OF THE PREFERRED EMBODIMENTS

Embodiment 1

First, in the present Embodiment 1, an outline configuration of a camera is described below that employs an imaging device comprising: a zoom lens system that forms an optical image of an object; and an image sensor that converts into an electric image signal the optical image formed by the zoom lens system.

Figure 1:
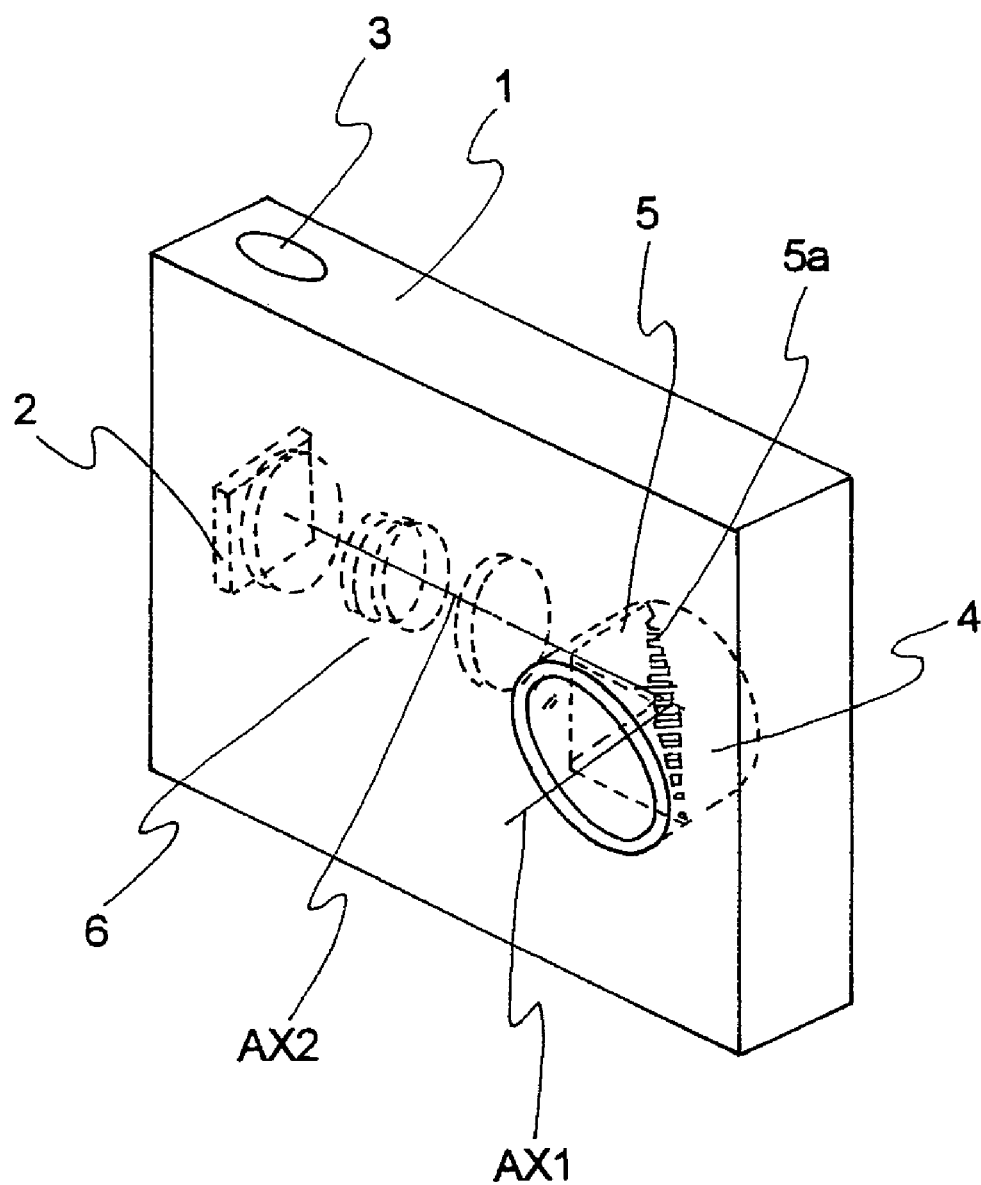
FIG. 1 is a transparent perspective view showing an outline configuration in an imaging state of a camera employing an imaging device according to Embodiment 1.

FIG. 1 is a transparent perspective view showing an outline configuration in the imaging state of a camera employing the imaging device according to Embodiment 1. Here, FIG. 1 is a drawing schematically showing an imaging device according to Embodiment 1. Thus, the scale and the detailed layout can differ from actual ones. In FIG. 1, a camera employing an imaging device according to Embodiment 1 comprises: a body 1; an image sensor 2; a shutter button 3; a first lens unit 4 that includes a lens element 5 having a reflecting surface 5a and that is arranged on the most object side; and an image side lens unit 6 arranged on the image side relative to the first lens unit 4. Among these, the first lens unit 4 and the image side lens unit 6 constitute a zoom lens system, and thereby form an optical image of an object in a light acceptance surface of the image sensor 2. Among these, the zoom lens system is held by a lens holding barrel in a lens barrel, while the zoom lens system held by the lens holding barrel and the image sensor 2 constitute an imaging device. Thus, the camera comprises: the body 1; and the imaging device constructed from the zoom lens system and the image sensor 2.

In an imaging state of the camera according to Embodiment 1, the image sensor 2 is an image sensor such as a CCD or a CMOS, and generates and outputs an electric image signal on the basis of the optical image formed in the light acceptance surface by the zoom lens system. The shutter button 3 is arranged on the upper face of the body 1, and determines the acquisition timing for an image signal of the image sensor 2 when operated by an operator. The lens element 5 has a reflecting surface for bending the light beam from the object, that is, a reflecting surface 5a for bending by approximately 90° the optical axis AX1 of the first lens unit 4 (an axial principal ray from the object), and thereby deflects the object light exiting from the first lens unit 4 toward the image side lens unit 6. The image side lens unit 6 is arranged on the optical axis AX2, and thereby transmits to the image sensor 2 the object light deflected by the reflecting surface 5a.

In the zoom lens system employed in the camera according to Embodiment 1, a lens element 5 having a reflecting surface 5a is included in the first lens unit 4 so that the light beam from the object is bent by the reflecting surface 5a. Thus, in an imaging state, the zoom lens system can be constructed thin in the optical axis direction of the axial light beam from the object. Accordingly, for example, in the case of a zoom lens system having a variable overall length, an accommodated state is realized approximately in the imaging state at the wide-angle limit without the necessity that the first lens unit that includes the lens element having a reflecting surface and at least one image side lens unit should be moved and escaped from the position of imaging state. Further, for example, in the case of a zoom lens system having a fixed overall length, an accommodated state is realized in a state near the imaging state at the wide-angle limit.

The lens barrel accommodating the zoom lens system according to Embodiment 1 comprises in general: a main body; a first lens unit holding barrel; holding barrels each holding at least one image side lens unit; and guide shafts. In the imaging state, in the inside of the main body, all constructions of the imaging device are held and arranged in respective holding barrels. In the accommodated state, all the constructions of the imaging device are accommodated intact inside the main body.

When the zoom lens system according to Embodiment 1 is in the imaging state at the telephoto limit, the first lens unit holding barrel and the holding barrels each holding at least one image side lens unit are arranged respectively at predetermined positions on the optical axis of the light beam (a reflected object light, hereinafter) from the object bent by the reflecting surface at the telephoto limit.

When the zoom lens system according to Embodiment 1 transits from the imaging state at the telephoto limit to the imaging state at the wide-angle limit, each holding barrel that holds each image side lens unit moves along the optical axis of the reflected object light with being guided by the guide shafts, and then stops at each predetermined position on the optical axis of the reflected object light at the wide-angle limit. Preferably, the first lens unit holding barrel is fixed during this time. Then, as described above, for example, in the case of a zoom lens system having a variable overall length, the imaging state at the wide-angle limit, that is, a state that the interval between the first lens unit and the second lens unit that is arranged immediately on the image side of the first lens unit is approximately the minimum, may be adopted as an accommodated state. Further, for example, in the case of a zoom lens system having a fixed overall length, a state near this imaging state at the wide-angle limit, that is, a state that the interval between the first lens unit and the second lens unit that is arranged immediately on the image side of the first lens unit is near the minimum, may be adopted as an accommodated state.

In contrast, when the zoom lens system according to Embodiment 1 transits from the imaging state at the wide-angle limit to the imaging state at the telephoto limit, each holding barrel that holds each image side lens unit moves along the optical axis of the reflected object light with being guided by the guide shafts, and then stops at each predetermined position on the optical axis of the reflected object light at the telephoto limit. Similarly, preferably, the first lens unit holding barrel is fixed during this time. Then, the holding barrels stop at a position where the interval between the first lens unit and the second lens unit arranged immediately on the image side of the first lens unit becomes the maximum, so that the imaging state at the telephoto limit is realized.

As such, in the zoom lens system according to Embodiment 1, a lens element having a reflecting surface for bending the light beam from the object, that is, a reflecting surface for bending by approximately 90° the axial principal ray from the object, is included in the first lens unit arranged on the most object side. Thus, in the imaging state, the zoom lens system can be constructed thin in the optical axis direction of the axial light beam from the object. This realizes thickness reduction in the imaging device and the camera.

Here, the embodiment of the above lens element having a reflecting surface is not limited to a specific one. The lens element having a reflecting surface may be any one of: a surface reflection prism; an internal reflection mirror having a parallel plate shape; and a surface reflection mirror having a parallel plate shape. However, a prism or a mirror having optical power is preferred in particular. Further, the reflecting surface may be fabricated by any one of known methods including: vapor deposition of metal such as aluminum; and forming of a dielectric multilayer film. Further, the reflecting surface need not have a reflectance of 100%. Thus, the reflectance may be appropriately adjusted when light for photometry or for an optical finder system need be extracted from the object light, or alternatively when the reflecting surface is used as part of an optical path for projecting auto-focusing auxiliary light or the like through itself.

Further, the configuration of the first lens unit is not limited to a specific one, as long as a lens element having a reflecting surface is included. However, preferably, for example, the first lens unit, in order from the object side to the image side, comprises: a lens element having negative optical power; a lens element having a reflecting surface; and subsequent lens elements including at least one lens element and having positive optical power.

Embodiment 2

An imaging device according to Embodiment 2 is the same as the imaging device according to Embodiment 1. However, the arrangement direction layout of the optical axis of reflected object light is different at the time of arranging in a camera. That is, a camera employing the imaging device according to Embodiment 1 adopts a layout that the optical axis of reflected object light is arranged perpendicular to the stroke direction of the shutter button while the imaging device is arranged horizontally. In contrast, the camera employing the imaging device according to Embodiment 2 adopts a layout that the optical axis of reflected object light is arranged in parallel to the stroke direction of the shutter button while the imaging device is arranged vertically.

As such, in the imaging device according to Embodiment 2, arrangement flexibility is increased when the imaging device is applied to the camera, and so is the flexibility in designing of a camera.

Here, also in the lens barrel employed in the imaging device according to Embodiment 2, similarly to the lens barrel employed in the imaging device according to Embodiment 1, for example, in the case of a zoom lens system having a variable overall length, transition is performed from the imaging state at the telephoto limit to the imaging state at the wide-angle limit, so that this imaging state at the wide-angle limit, that is, a state that the interval between the first lens unit and the second lens unit that is arranged immediately on the image side of the first lens unit is approximately the minimum, may be adopted as an accommodated state. Further, for example, in the case of a zoom lens system having a fixed overall length, a state near this imaging state at the wide-angle limit, that is, a state that the interval between the first lens unit and the second lens unit that is arranged immediately on the image side of the first lens unit is near the minimum, may be adopted as an accommodated state.

Embodiments 3 to 7

Figure 2A:
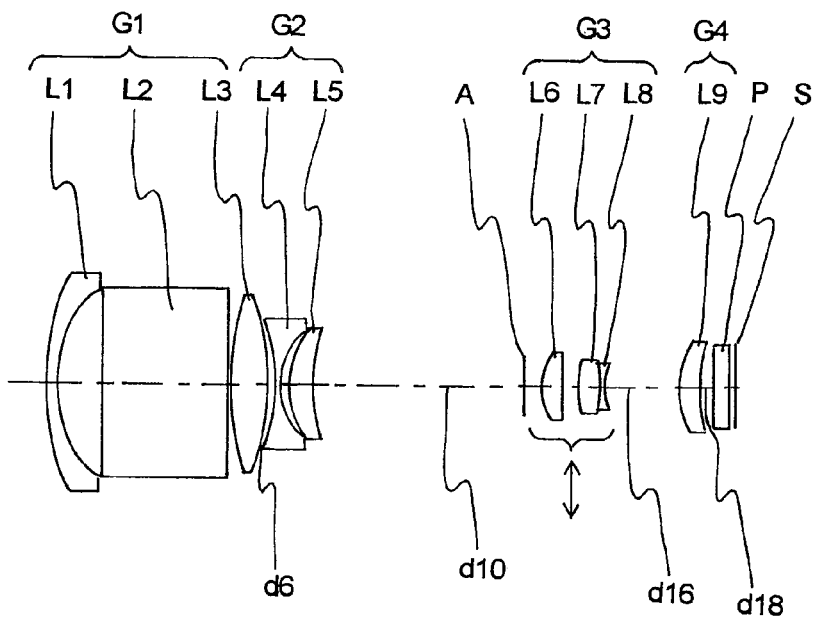
FIGS. 2A to 2C are lens arrangement diagrams showing a zoom lens system according to Embodiment 3 (Example 1) in an infinity in-focus condition at a wide-angle limit, a middle position and a telephoto limit.
Figure 2B:
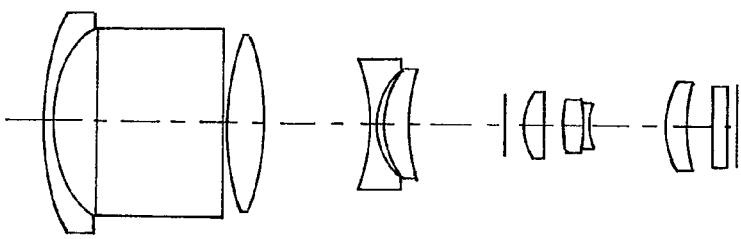
Figure 2C:
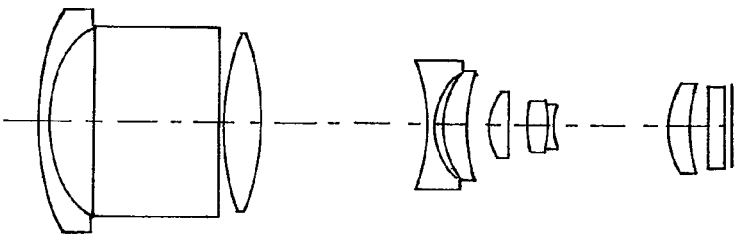
Figure 4A:
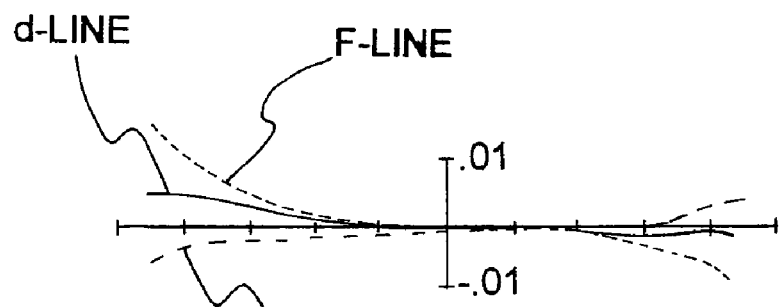
FIGS. 4A to 4F are lateral aberration diagrams of a zoom lens system according to Example 1 at a telephoto limit.
Figure 4B:
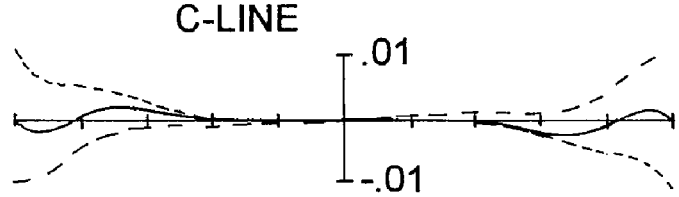
Figure 4C:
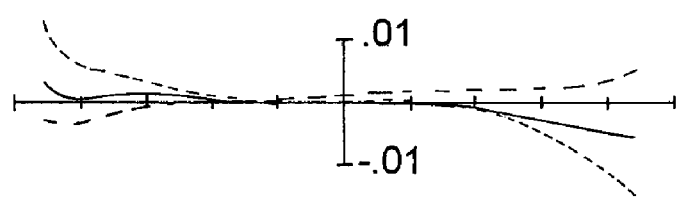
Figure 4D:
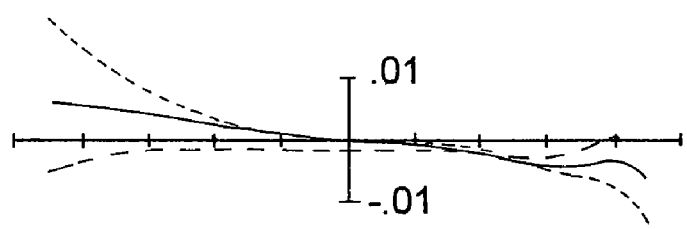
Figure 4E:
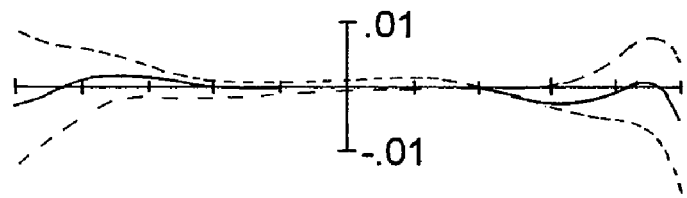
Figure 4F:
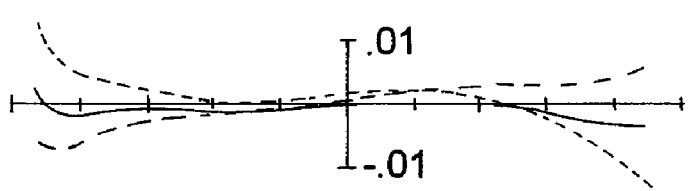
Figure 5A:
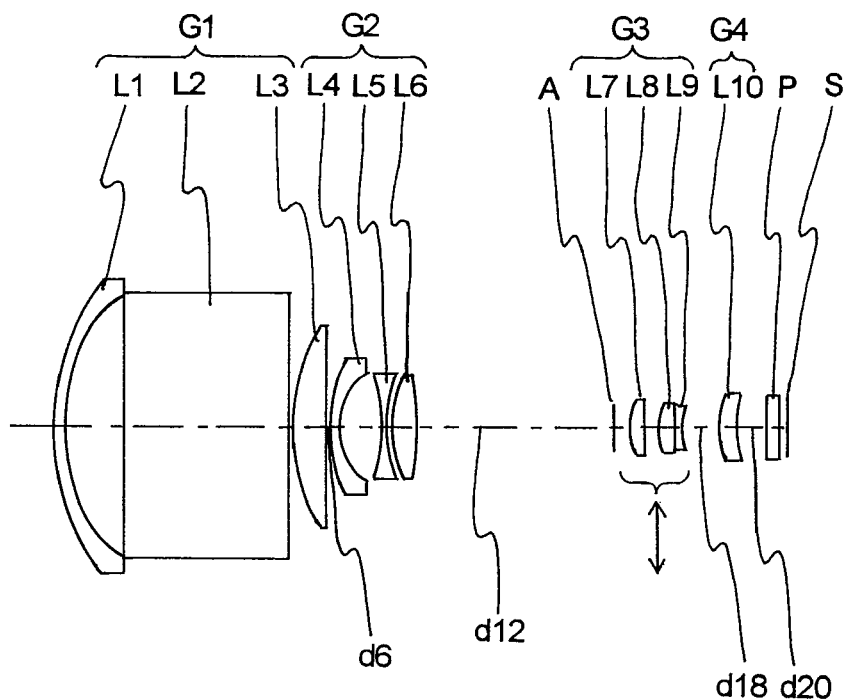
FIGS. 5A to 5C are lens arrangement diagrams showing a zoom lens system according to Embodiment 4 (Example 2) in an infinity in-focus condition at a wide-angle limit, a middle position and a telephoto limit.
Figure 5B:
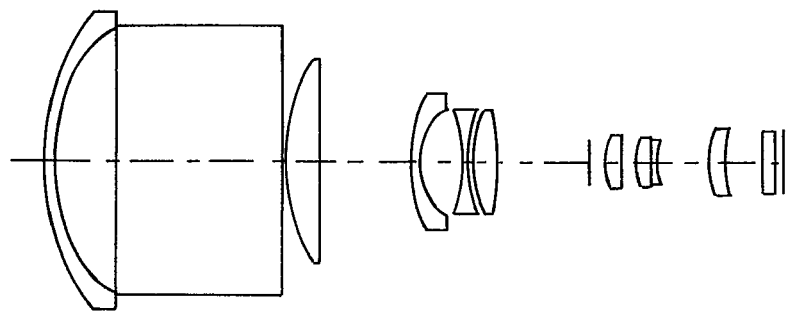
Figure 5C:
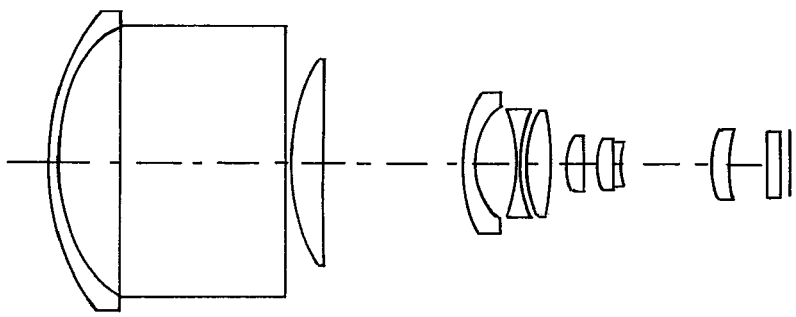
Figure 6A:
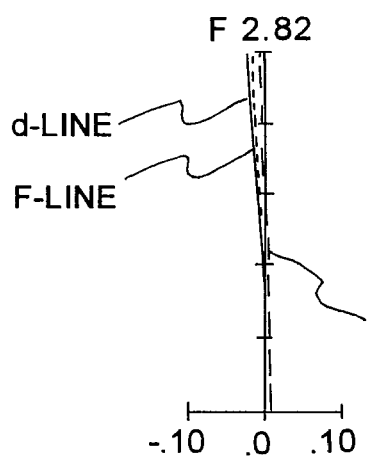
FIGS. 6A to 6I are longitudinal aberration diagrams of a zoom lens system according to Example 2 in an infinity in-focus condition at a wide-angle limit, a middle position and a telephoto limit.
Figure 6B:
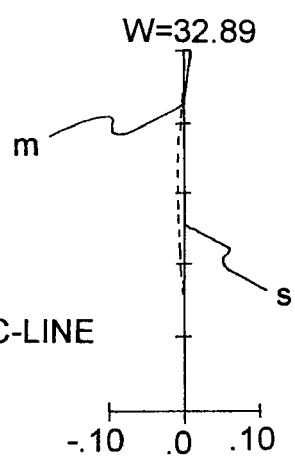
Figure 6C:
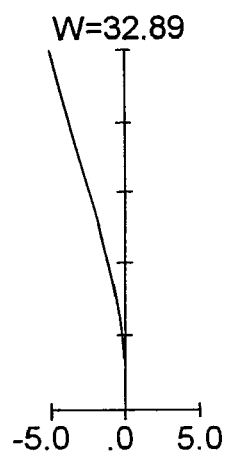
Figure 6D:
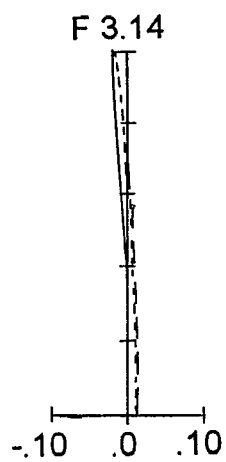
Figure 6E:
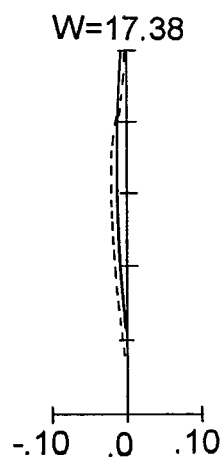
Figure 6F:
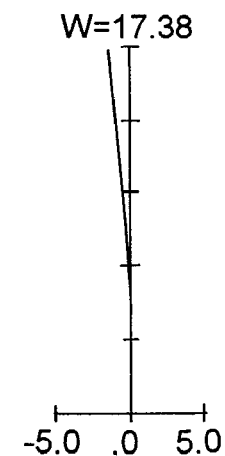
Figure 6G:
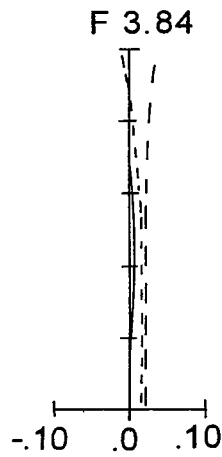
Figure 6H:
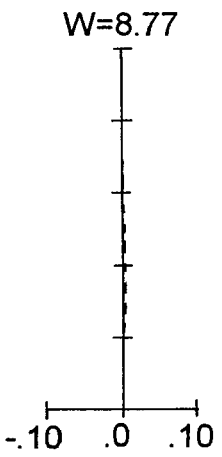
Figure 6I:
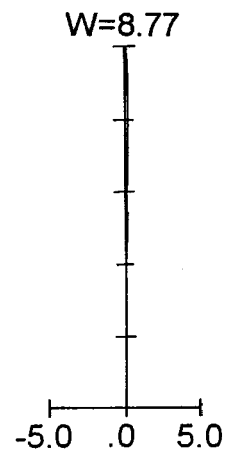
Figure 7A:
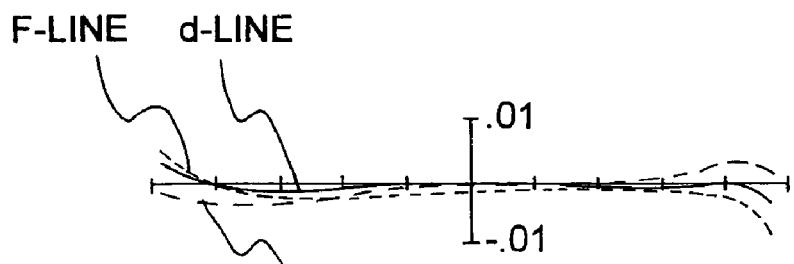
FIGS. 7A to 7F are lateral aberration diagrams of a zoom lens system according to Example 2 at a telephoto limit.
Figure 7B:
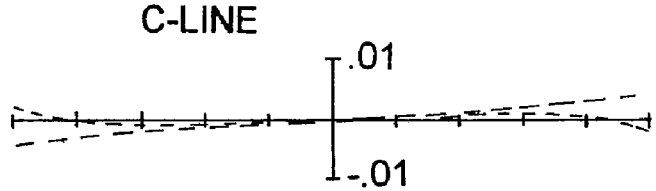
Figure 7C:
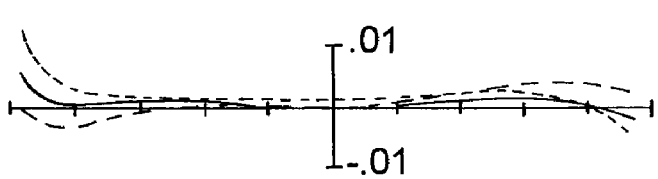
Figure 7D:
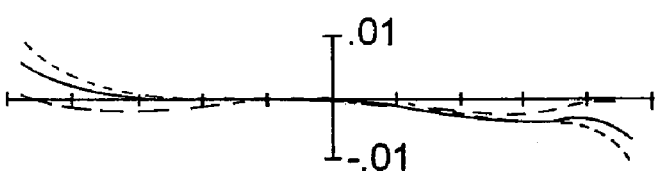
Figure 7E:
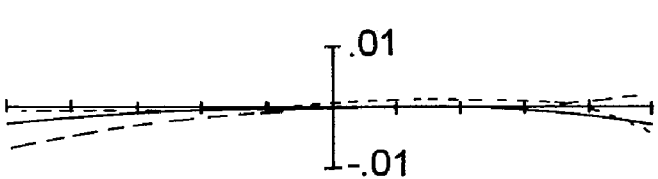
Figure 7F:
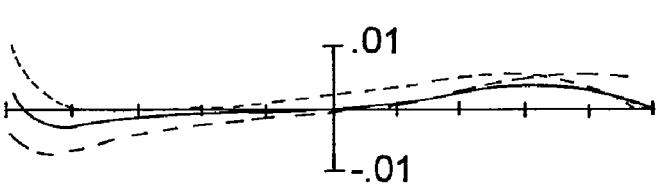
Figure 8A:
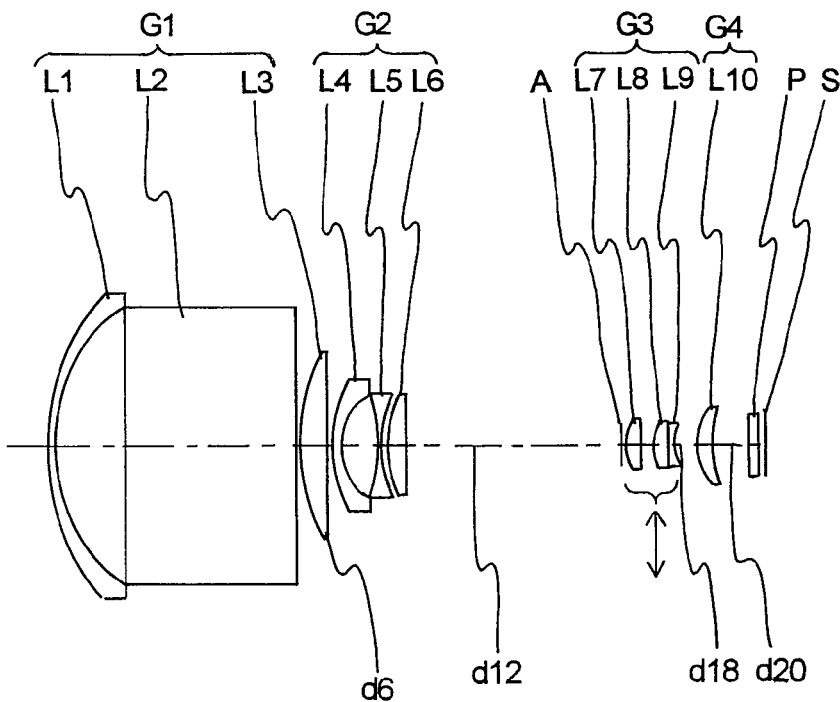
FIGS. 8A to 8C are lens arrangement diagrams showing a zoom lens system according to Embodiment 5 (Example 3) in an infinity in-focus condition at a wide-angle limit, a middle position and a telephoto limit.
Figure 8B:
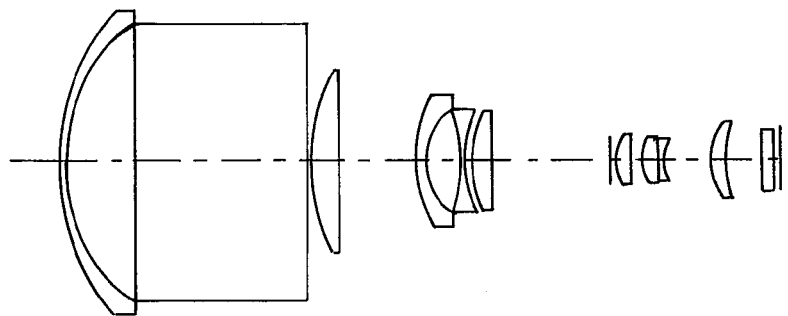
Figure 8C:
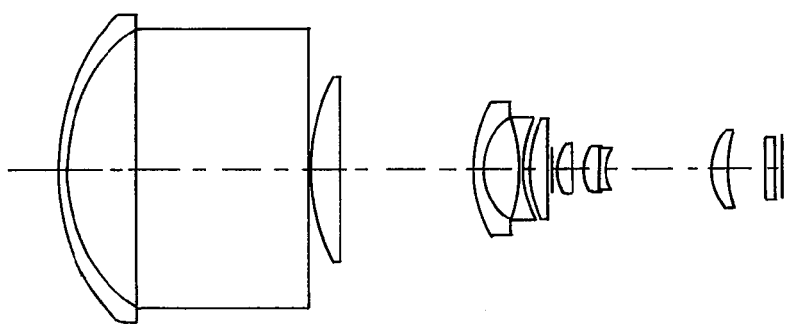
Figure 9A:
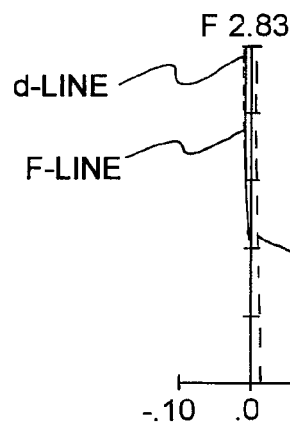
FIGS. 9A to 9I are longitudinal aberration diagrams of a zoom lens system according to Example 3 in an infinity in-focus condition at a wide-angle limit, a middle position and a telephoto limit.
Figure 9B:
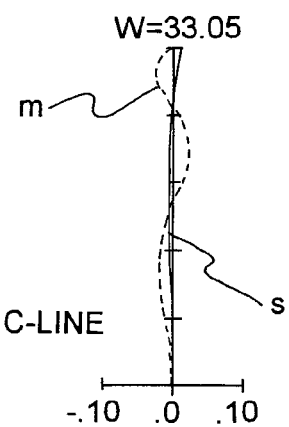
Figure 9C:
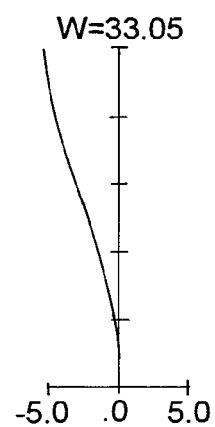
Figure 9D:
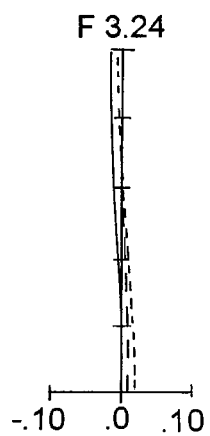
Figure 9E:
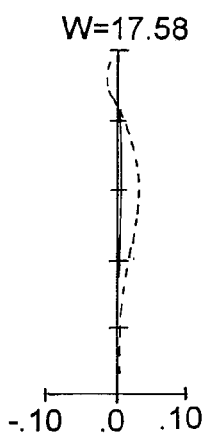
Figure 9F:
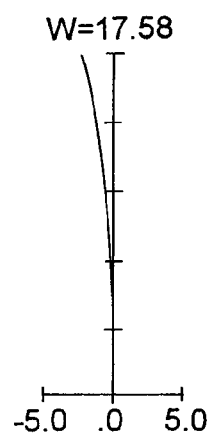
Figure 9G:
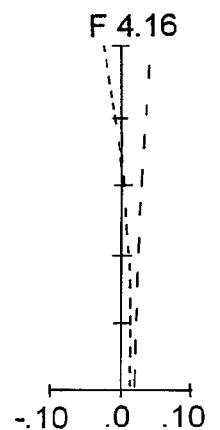
Figure 9H:
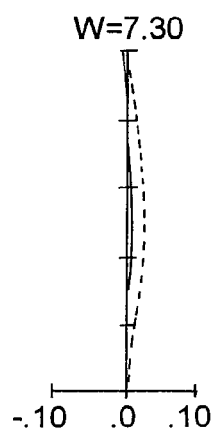
Figure 9I:
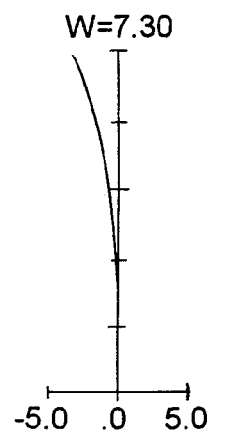
Figure 10A:
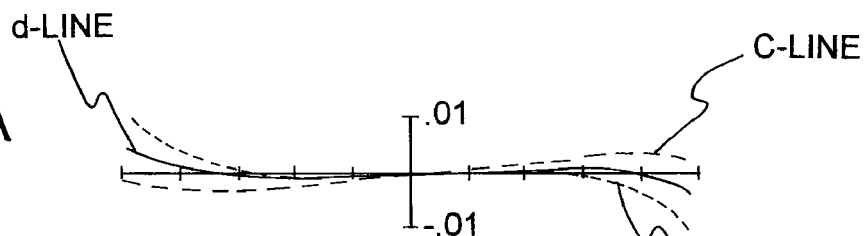
FIGS. 10A to 10F are lateral aberration diagrams of a zoom lens system according to Example 3 at a telephoto limit.
Figure 10B:
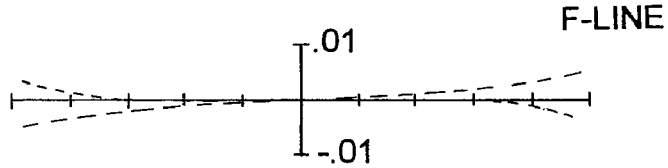
Figure 10C:
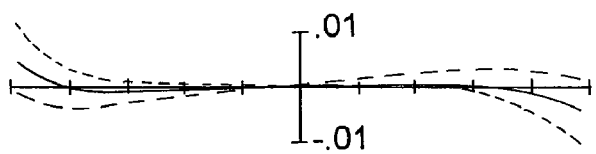
Figure 10D:
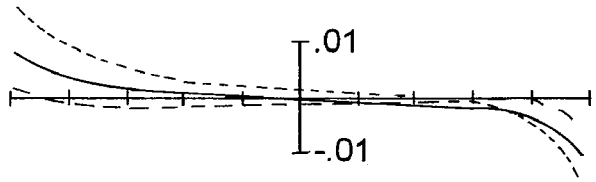
Figure 10E:
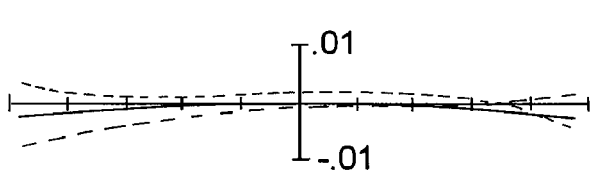
Figure 10F:
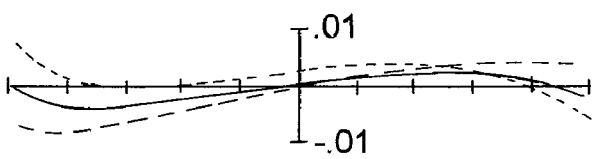
Figure 12A:
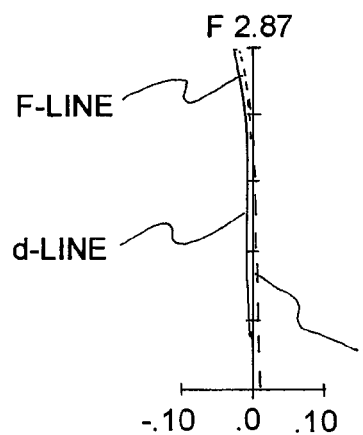
FIGS. 12A to 12I are longitudinal aberration diagrams of a zoom lens system according to Example 4 in an infinity in-focus condition at a wide-angle limit, a middle position and a telephoto limit.
Figure 12B:
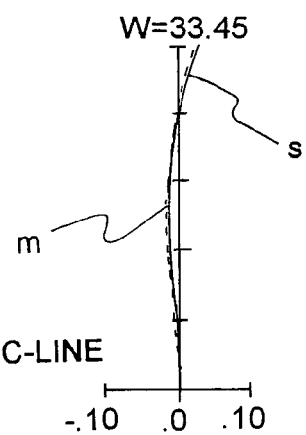
Figure 12C:
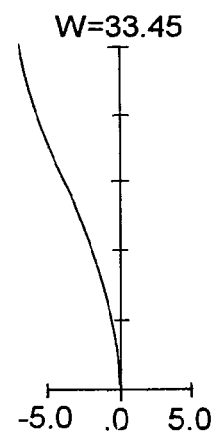
Figure 12D:
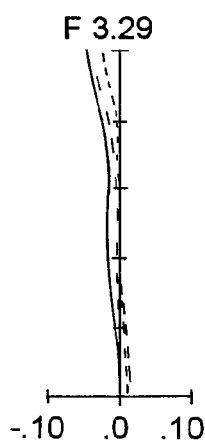
Figure 12E:
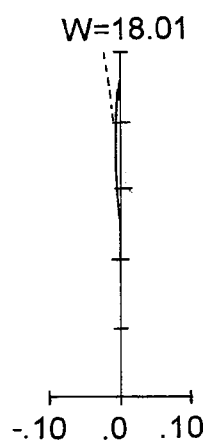
Figure 12F:
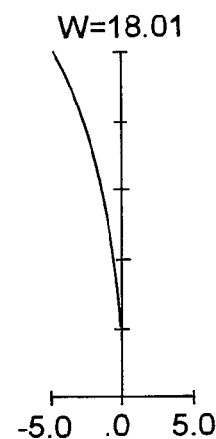
Figure 12G:
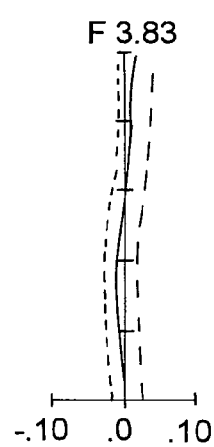
Figure 12H:
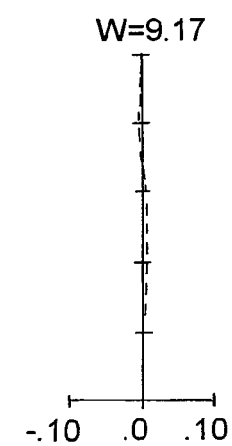
Figure 12I:
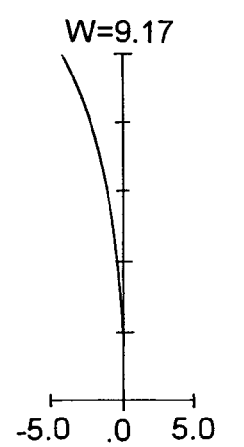
Figure 13A:
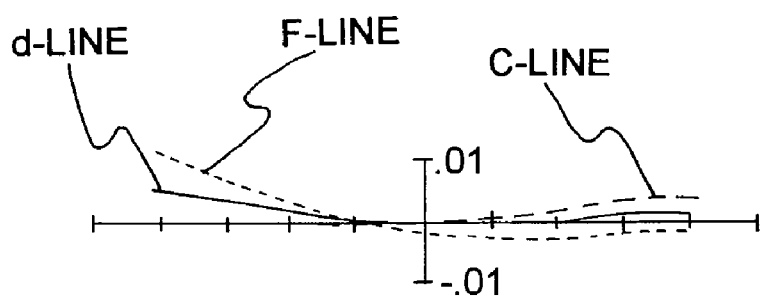
FIGS. 13A to 13F are lateral aberration diagrams of a zoom lens system according to Example 4 at a telephoto limit.
Figure 13B:
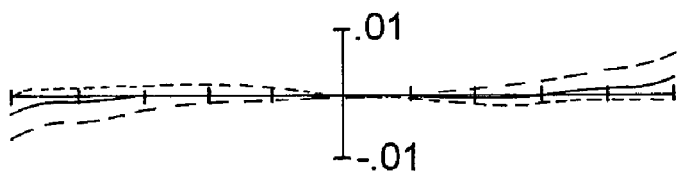
Figure 13C:
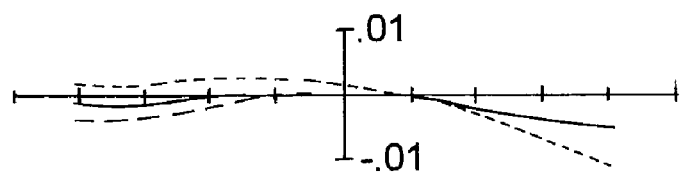
Figure 13D:
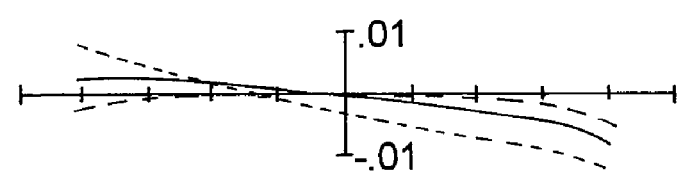
Figure 13E:
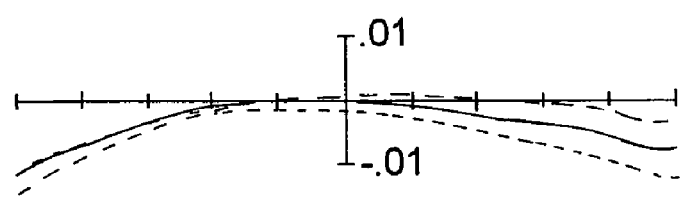
Figure 13F:
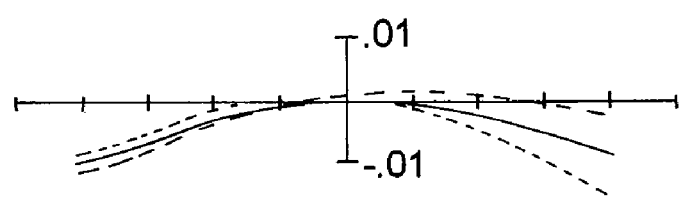
Figure 14A:
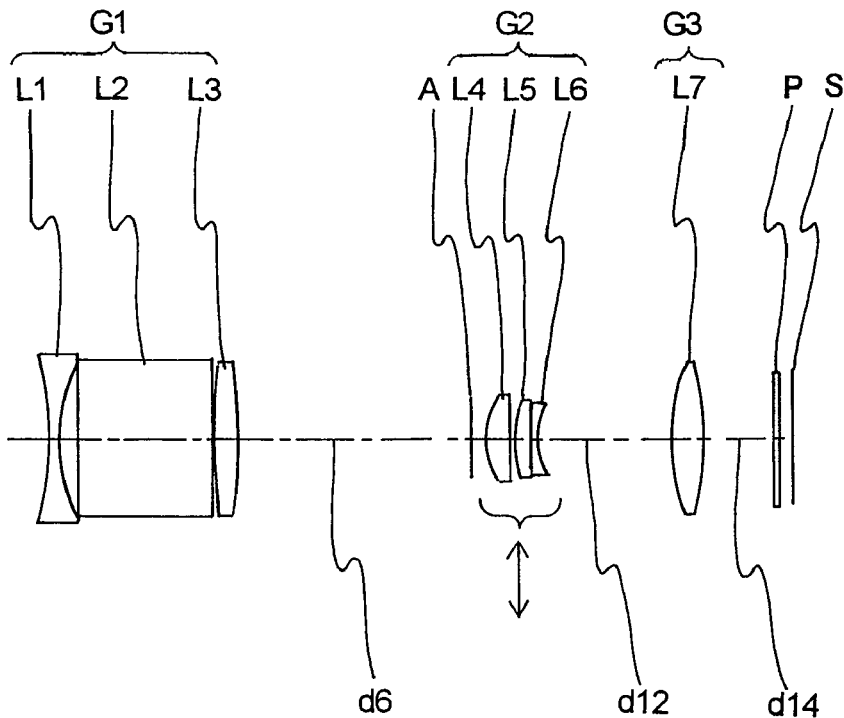
FIGS. 14A to 14C are lens arrangement diagrams showing a zoom lens system according to Embodiment 7 (Example 5) in an infinity in-focus condition at a wide-angle limit, a middle position and a telephoto limit.
Figure 14B:
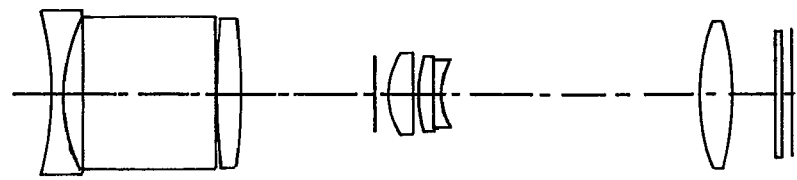
Figure 14C:
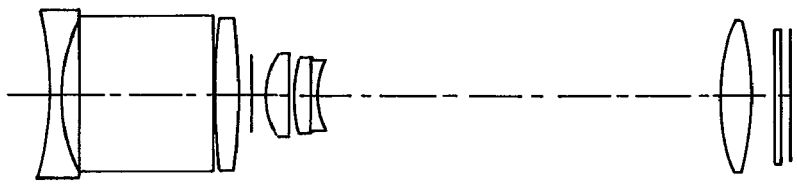
Figure 15A:
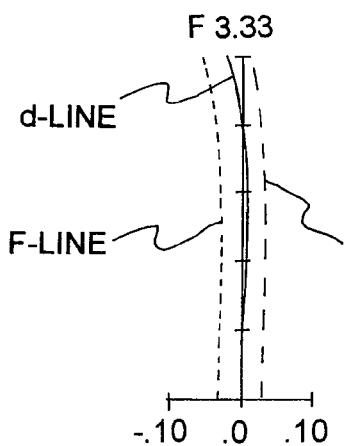
FIGS. 15A to 15I are longitudinal aberration diagrams of a zoom lens system according to Example 5 in an infinity in-focus condition at a wide-angle limit, a middle position and a telephoto limit.
Figure 15B:
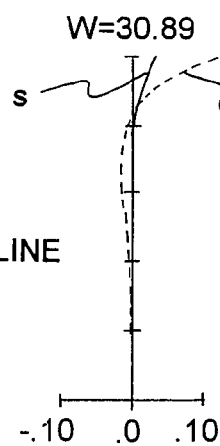
Figure 15C:
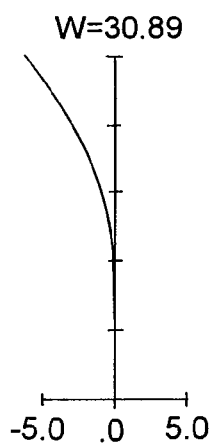
Figure 15D:
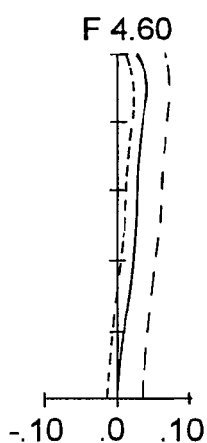
Figure 15E:
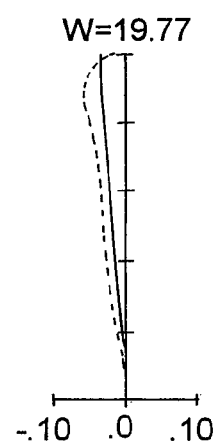
Figure 15F:
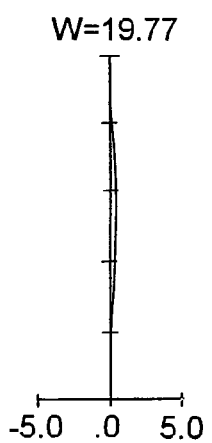
Figure 15G:
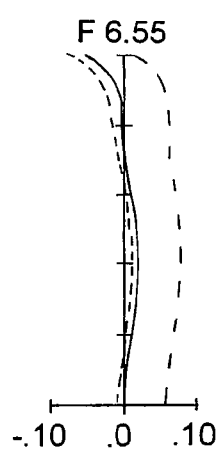
Figure 15H:
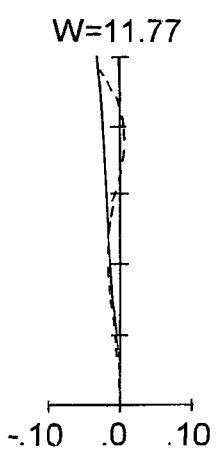
Figure 15I:
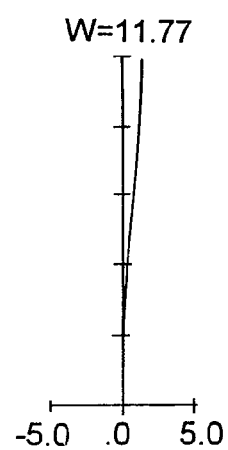

The zoom lens system applicable to the imaging device of Embodiments 1 and 2 is described below in further detail with reference to the drawings. FIGS. 2A to 2C are lens arrangement diagrams of a zoom lens system according to Embodiment 3. FIGS. 5A to 5C are lens arrangement diagrams of a zoom lens system according to Embodiment 4. FIGS. 8A to 8C are lens arrangement diagrams of a zoom lens system according to Embodiment 5. FIGS. 11A to 11C are lens arrangement diagrams of a zoom lens system according to Embodiment 6. FIGS. 14A to 14C are lens arrangement diagrams of a zoom lens system according to Embodiment 7.

FIGS. 2A, 5A, 8A, 11A and 14A show the lens construction at the wide-angle limit (the shortest focal length condition: focal length $f_W$). FIGS. 2B, 5B, 8B, 11B and 14B show the lens construction at the middle position (the middle focal length condition: focal length $f_M = \sqrt{(f_W * f_T)}$). FIGS. 2C, 5C, 8C, 11C and 14C show the lens construction at the telephoto limit (the longest focal length condition: focal length $f_T$).

Each zoom lens system according to Embodiments 3 to 6, in order from the object side to the image side, comprises: a first lens unit G1 having positive optical power; a second lens unit G2 having negative optical power; a diaphragm A; a third lens unit G3 having positive optical power; and a fourth lens unit G4 having positive optical power. Further, the zoom lens system according to Embodiment 7, in order from the object side to the image side, comprises: a first lens unit G1 having negative optical power; a diaphragm A; a second lens unit G2 having positive optical power; and a third lens unit G3 having positive optical power.

Here, a second lens element L2 in each embodiment corresponds to the lens element having a reflecting surface. In the description, the position of the reflecting surface is omitted. Further, in each of FIGS. 2A to 2C, 5A to 5C, 8A to 8C, 11A to 11C, and 14A to 14C, a straight line drawn on the rightmost side indicates the position of an image surface S. On its object side, a plane parallel plate P such as an optical low-pass filter, a face plate of an image sensor or the like is provided. In the zoom lens system according to Embodiments 3 to 7, these lens units are arranged in a desired optical power construction, so that size reduction is achieved in the entire lens system in a state that high optical performance is satisfied.

As shown in FIGS. 2A to 2C, in the zoom lens system according to Embodiment 3, the first lens unit G1, in order from the object side to the image side, comprises: a negative meniscus first lens element L1 with the convex surface facing the object side; a lens element L2 having plane incident and exit surfaces and a reflecting surface; and a bi-convex third lens element L3.

In the zoom lens system of Embodiment 3, the second lens unit G2, in order from the object side to the image side, comprises: a bi-concave fourth lens element L4; and a positive meniscus fifth lens element L5 with the convex surface facing the object side.

Further, in the zoom lens system according to Embodiment 3, the third lens unit G3, in order from the object side to the image side, comprises: a positive meniscus sixth lens element L6 with the convex surface facing the object side; a bi-convex seventh lens element L7; and a bi-concave eighth lens element L8. Among these, the seventh lens element L7 and the eighth lens element L8 are cemented with each other.

Furthermore, in the zoom lens system according to Embodiment 3, the fourth lens unit G4 comprises solely a positive meniscus ninth lens element L9 with the convex surface facing the object side.

In the zoom lens system according to Embodiment 3, in zooming from the wide-angle limit to the telephoto limit, the second lens unit G2 moves to the image side while the third lens unit G3 moves to the object side. Further, the fourth lens unit G4 moves with locus of a convex to the object side with changing the interval with the third lens unit G3. The first lens unit G1 is fixed relative to the image surface S.

As shown in FIGS. 5A to 5C, in the zoom lens system according to Embodiment 4, the first lens unit G1, in order from the object side to the image side, comprises: a negative meniscus first lens element L1 with the convex surface facing the object side; a lens element L2 having plane incident and exit surfaces and a reflecting surface; and a positive meniscus third lens element L3 with the convex surface facing the object side.

In the zoom lens system according to Embodiment 4, the second lens unit G2, in order from the object side to the image side, comprises: a negative meniscus fourth lens element L4 with the convex surface facing the object side; a bi-concave fifth lens element L5; and a bi-convex sixth lens element L6.

Further, in the zoom lens system according to Embodiment 4, the third lens unit G3, in order from the object side to the image side, comprises: a positive meniscus seventh lens element L7 with the convex surface facing the object side; a bi-convex eighth lens element L8; and a bi-concave ninth lens element L9. Among these, the eighth lens element L8 and the ninth lens element L9 are cemented with each other.

Furthermore, in the zoom lens system according to Embodiment 4, the fourth lens unit G4 comprises solely a positive meniscus tenth lens element L10 with the convex surface facing the object side.

In the zoom lens system according to Embodiment 4, in zooming from the wide-angle limit to the telephoto limit, the second lens unit G2 moves to the image side, while the third lens unit G3 and the fourth lens unit G4 move to the object side, and while the first lens unit G1 is fixed relative to the image surface S.

As shown in FIGS. 8A to 8C, in the zoom lens system according to Embodiment 5, the first lens unit G1, in order from the object side to the image side, comprises: a negative meniscus first lens element L1 with the convex surface facing the object side; a lens element L2 having plane incident and exit surfaces and a reflecting surface; and a bi-convex third lens element L3.

In the zoom lens system of Embodiment 5, the second lens unit G2, in order from the object side to the image side, comprises: a negative meniscus fourth lens element L4 with the convex surface facing the object side; a bi-concave fifth lens element L5; and a positive meniscus sixth lens element L6 with the convex surface facing the object side.

Further, in the zoom lens system of Embodiment 5, the third lens unit G3, in order from the object side to the image side, comprises: a positive meniscus seventh lens element L7 with the convex surface facing the object side; a positive meniscus eighth lens element L8 with the convex surface facing the object side; and a negative meniscus ninth lens element L9 with the convex surface facing the object side. Among these, the eighth lens element L8 and the ninth lens element L9 are cemented with each other.

Furthermore, in the zoom lens system according to Embodiment 5, the fourth lens unit G4 comprises solely a positive meniscus tenth lens element L10 with the convex surface facing the object side.

In the zoom lens system according to Embodiment 5, in zooming from the wide-angle limit to the telephoto limit, the second lens unit G2 moves to the image side, while the third lens unit G3 and the fourth lens unit G4 move to the object side, and while the first lens unit G1 is fixed relative to the image surface S.

As shown in FIGS. 11A to 11C, in the zoom lens system according to Embodiment 6, the first lens unit G1, in order from the object side to the image side, comprises: a negative meniscus first lens element L1 with the convex surface facing the object side; a lens element L2 having plane incident and exit surfaces and a reflecting surface; and a bi-convex third lens element L3.

In the zoom lens system according to Embodiment 6, the second lens unit G2, in order from the object side to the image side, comprises: a negative meniscus fourth lens element L4 with the convex surface facing the object side; a bi-concave fifth lens element L5; and a bi-convex sixth lens element L6.

Further, in the zoom lens system according to Embodiment 6, the third lens unit G3, in order from the object side to the image side, comprises: a bi-convex seventh lens element L7; a bi-convex eighth lens element L8; and a bi-concave ninth lens element L9. Among these, the eighth lens element L8 and the ninth lens element L9 are cemented with each other.

Furthermore, in the zoom lens system according to Embodiment 6, the fourth lens unit G4 comprises solely a positive meniscus tenth lens element L10 with the convex surface facing the object side.

In the zoom lens system according to Embodiment 6, in zooming from the wide-angle limit to the telephoto limit, the second lens unit G2 and the fourth lens unit G4 move to the image side, while the third lens unit G3 moves to the object side, and while the first lens unit G1 is fixed relative to the image surface S.

As shown in FIGS. 14A to 14C, in the zoom lens system according to Embodiment 7, the first lens unit G1, in order from the object side to the image side, comprises: a bi-concave first lens element L1; a lens element L2 having plane incident and exit surfaces and a reflecting surface; and a bi-convex third lens element L3.

In the zoom lens system of Embodiment 7, the second lens unit G2, in order from the object side to the image side, comprises: a positive meniscus fourth lens element L4 with the convex surface facing the object side; a positive meniscus fifth lens element L5 with the convex surface facing the object side; and a negative meniscus sixth lens element L6 with the convex surface facing the object side. Among these, the fifth lens element L5 and the sixth lens element L6 are cemented with each other.

Further, in the zoom lens system of Embodiment 7, the third lens unit G3 comprises solely a bi-convex seventh lens element L7.

In the zoom lens system according to Embodiment 7, in zooming from the wide-angle limit to the telephoto limit, the second lens unit G2 moves to the object side, while the third lens unit G3 moves to the image side, and while the first lens unit G1 is fixed relative to the image surface S.

As described above, the zoom lens system according to Embodiments 3 to 7 has a plurality of lens units each composed of at least one lens element, while the first lens unit G1 includes a lens element having a reflecting surface for bending the light beam from the object. However, the number of lens units constituting the zoom lens system is not limited to a specific value. That is, a four-unit construction or a three-unit construction may be employed as in Embodiments 3 to 7, while another construction may be employed.

Further, preferably, a zoom lens system of four-unit construction composed of four lens units, in order from the object side to the image side, comprises: a first lens unit having positive optical power; a second lens unit having negative optical power; and subsequent lens units that include at least one lens unit having positive optical power. More preferably, for example, as in Embodiments 3 to 6, the subsequent lens units, in order from the object side to the image side, comprise a third lens unit having positive optical power and a fourth lens unit having positive optical power.

Further, preferably, a zoom lens system of three-unit construction composed of three lens units, in order from the object side to the image side, comprises: a first lens unit having negative optical power; and subsequent lens units that include at least one lens unit having positive optical power. More preferably, for example, as in Embodiment 7, the subsequent lens units, in order from the object side to the image side, comprise a second lens unit having positive optical power and a third lens unit having positive optical power.

Further, as in Embodiments 3 to 7, in the case of a zoom lens system of four-unit construction composed of four lens units or alternatively a zoom lens system of three-unit construction composed of three lens units, in zooming from the wide-angle limit to the telephoto limit at the time of imaging, preferably, the first lens unit that includes the lens element having a reflecting surface does not move in the optical axis direction and is fixed relative to the image surface S.

In the zoom lens system according to Embodiments 3 to 7, an interval between at least any two lens units among the plurality of lens units is changed so that zooming is performed. Then, any one of these lens units, any one of the lens elements, or alternatively a plurality of adjacent lens elements that constitute one lens unit move in a direction perpendicular to the optical axis, so that blur caused in the image by hand blur, vibration or the like is compensated optically.

In each embodiment, the member that moves in a direction perpendicular to the optical axis is any one of the plurality of lens units constituting the zoom lens system, any one of the lens elements that constitute a lens unit, or alternatively a plurality of adjacent lens elements that constitute one lens unit. As such, when any one of these lens units, any one of the lens elements, or alternatively a plurality of adjacent lens elements that constitute one lens unit move in a direction perpendicular to the optical axis, image blur is compensated in such a manner that size increase in the entire zoom lens system is suppressed while excellent imaging characteristics such as small decentering coma aberration and decentering astigmatism are satisfied.

In each embodiment, when a lens unit that does not include the lens element having a reflecting surface, that is, any one of the lens units other than the first lens unit, any one of the lens elements other than the lens element having a reflecting surface, or alternatively a plurality of adjacent lens elements that are other than the lens element having a reflecting surface and that constitute one lens unit move in a direction perpendicular to the optical axis, the entire zoom lens system can be constructed more compact. Further, image blur can be compensated in a state that excellent imaging characteristics are satisfied. Thus, this construction is preferable. More preferably, any one of the lens units other than the first lens unit moves in a direction perpendicular to the optical axis.

Further, in each embodiment, preferably, any one of the lens units or alternatively a plurality of adjacent lens elements constituting one lens unit, which move in a direction perpendicular to the optical axis, comprise three lens elements, from the perspective that image blur can be compensated more satisfactorily in a state that excellent imaging characteristics are satisfied.

In the case of a zoom lens system of four-unit construction composed of four lens units as in Embodiments 3 to 6, preferably, the entirety of the third lens unit or alternatively part of the lens elements that constitute the third lens unit move in a direction perpendicular to the optical axis. In the case of a zoom lens system of three-unit construction composed of three lens units as in Embodiment 7, preferably, the entirety of the second lens unit or alternatively part of the lens elements that constitute the second lens unit move in a direction perpendicular to the optical axis.

Conditions are described below that are preferably satisfied by a zoom lens system like the zoom lens system according to Embodiments 3 to 7 having a plurality of lens units each composed of at least one lens element, in which: an interval between at least any two lens units among the lens units is changed so that zooming is performed; a lens element having a reflecting surface is included in a first lens unit among the lens units; and any one of the lens units, any one of the lens elements, or alternatively a plurality of adjacent lens elements that constitute one lens unit move in a direction perpendicular to the optical axis. Here, a plurality of preferable conditions are set forth for the zoom lens system according to each embodiment. The construction that satisfies all the plural conditions is most desirable for the zoom lens system. However, when an individual condition is satisfied, a zoom lens system providing the corresponding effect can be obtained.

For example, in a zoom lens system like the zoom lens system according to Embodiments 3 to 7, it is preferable that the following conditions (1) and (a) are satisfied;

$$0.2 < P_W/Y_W \times 10^{-3} < 1.7 \tag{1}$$

$$Z = f_T/f_W > 2.5 \tag{a}$$

where, $P_W$ is an optical axial distance between the reflecting surface and an object side principal point of the lens unit or lens element that moves in a direction perpendicular to the optical axis, at the wide-angle limit, $Y_W$ is an amount of movement at the time of maximum blur compensation for the lens unit or lens element that moves in a direction perpendicular to the optical axis, in a focal length $f_W$ of the entire system at the wide-angle limit, $f_W$ is a focal length of the entire zoom lens system at the wide-angle limit, and $f_T$ is a focal length of the entire zoom lens system at the telephoto limit.

The condition (1) sets forth the optical axial distance from the lens element having a reflecting surface to the lens unit or lens element that moves in a direction perpendicular to the optical axis. When the value exceeds the upper limit of the condition (1), the optical axial distance from the lens element having a reflecting surface to the lens unit or lens element that moves in a direction perpendicular to the optical axis increases, and so does the overall length of the zoom lens system. Thus, providing of a compact zoom lens system becomes difficult. In contrast, when the value goes below the lower limit of the condition (1), the amount of lens compensation increases so that excessive compensation can be performed. This can cause large degradation in the optical performance.

Here, when at least one of the following conditions (1)' and (1)" and (a) are satisfied, the above effect is achieved more successfully.

$$0.2 < P_W/Y_W \times 10^{-3} < 0.4 \tag{1'}$$

$$1.0 < P_W/Y_W \times 10^{-3} < 1.7 \tag{1''}$$

$$Z = f_T/f_W > 2.5 \tag{a}$$

Further, for example, in a zoom lens system like the zoom lens system according to Embodiments 3 to 7, it is preferable that the following conditions (2) and (a) are satisfied;

$$0.4 < f_1/Y_W \times 10^{-3} < 1.5 \tag{2}$$

$$Z = f_T/f_w > 2.5 \tag{a}$$

where, $f_1$ is a composite focal length of the first lens unit, $Y_W$ is the amount of movement at the time of maximum blur compensation for the lens unit or lens element that moves in a direction perpendicular to the optical axis, in a focal length $f_W$ of the entire system at the wide-angle limit, $f_W$ is the focal length of the entire zoom lens system at the wide-angle limit, and $f_T$ is the focal length of the entire zoom lens system at the telephoto limit.

The condition (2) sets forth a condition concerning the aberration performance at the time of blur compensation. When the value exceeds the upper limit of the condition (2), aberration fluctuation becomes large in the entire zoom lens system. Thus, large coma aberration can occur, and hence this situation is undesirable. In contrast, when the value goes below the lower limit of the condition (2), the diameter increases in the first lens unit that includes the lens element having a reflecting surface. Thus, providing of a compact zoom lens system becomes difficult.

Here, when at least one of the following conditions (2)' and (2)" and (a) are satisfied, the above effect is achieved more successfully.

$$0.4 < f_1/Y_W \times 10^{-3} < 0.6 \quad (2)'$$

$$1.0 < f_1/Y_W \times 10^{-3} < 1.5 \quad (2)''$$

$$Z = f_T/f_W > 2.5 \quad (a)$$

Further, for example, in a zoom lens system like the zoom lens system according to Embodiments 3 to 7, it is preferable that the following conditions (3) and (a) are satisfied;

$$0.1 < PF/Y_W \times 10^{-3} < 1.0 \quad (3)$$

$$Z = f_T/f_W > 2.5 \quad (a)$$

where,

PF is an optical axial distance from a position on the most object side on the optical axis of a lens element located on the most object side to a position on the most image side on the optical axis of the lens element having a reflecting surface, $Y_W$ is the amount of movement at the time of maximum blur compensation for the lens unit or lens element that moves in a direction perpendicular to the optical axis, in a focal length $f_W$ of the entire system at the wide-angle limit, $f_W$ is the focal length of the entire zoom lens system at the wide-angle limit, and $f_T$ is the focal length of the entire zoom lens system at the telephoto limit.

The condition (3) sets forth the thickness of the zoom lens system in the longitudinal direction. When the value exceeds the upper limit of the condition (3), the thickness of the zoom lens system in the longitudinal direction increases, so that providing of a compact imaging device or a compact camera becomes difficult. In contrast, when the value goes below the lower limit of the condition (3), ensuring of the sufficient distance set forth above for containing the lens element having a reflecting surface becomes difficult.

Here, when at least one of the following conditions (3)' and (3)" and (a) are satisfied, the above effect is achieved more successfully.

$$0.1 < PF/Y_W \times 10^{-3} < 0.3 \quad (3)'$$

$$0.6 < PF/Y_W \times 10^{-3} < 1.0 \quad (3)''$$

$$Z = f_T/f_W > 2.5 \quad (a)$$

Further, for example, in a zoom lens system like the zoom lens system according to Embodiments 3 to 7, it is preferable that the following condition (4) is satisfied;

$$1.0 < H_P/H_Y < 6.0 \quad (4)$$

where, $H_P$ is an optical axial thickness of the lens element having a reflecting surface, and $H_Y$ is an optical axial thickness of the lens unit or lens element that moves in a direction perpendicular to the optical axis.

The condition (4) sets forth the size of the lens element having a reflecting surface. When the value exceeds the upper limit of the condition (4), the lens element having a reflecting surface becomes large, so that providing of a compact zoom lens system becomes difficult. In contrast, when the value goes below the lower limit of the condition (4), the optical axial thickness of the lens unit or lens element that moves in a direction perpendicular to the optical axis increases, so that blur compensation becomes difficult.

Here, when at least one of the following conditions (4)' and (4)" is satisfied, the above effect is achieved more successfully.

$$1.0 < H_P/H_Y < 3.0 \quad (4)'$$

$$4.5 < H_P/H_Y < 6.0 \quad (4)''$$

Further, for example, in a zoom lens system like the zoom lens system according to Embodiments 3 to 7, it is preferable that the following condition (5) is satisfied;

$$0.3 < M_Y/H_P < 0.6 \quad (5)$$

where, $M_Y$ is an amount of movement in the optical axis direction for the lens unit or lens element that moves in a direction perpendicular to the optical axis in zooming from the wide-angle limit to the telephoto limit, and $H_P$ is the optical axial thickness of the lens element having a reflecting surface.

The condition (5) sets forth the amount of movement in the optical axis direction for the lens unit or lens element that moves in a direction perpendicular to the optical axis, relative to the optical axial thickness of the lens element having a reflecting surface. When the value exceeds the upper limit of the condition (5), the amount of movement in the optical axis direction for the lens unit or lens element that moves in a direction perpendicular to the optical axis increases, and so does the overall length of the zoom lens system. Thus, providing of a compact zoom lens system becomes difficult. In contrast, when the value goes below the lower limit of the condition (5), the optical axial thickness of the lens element having a reflecting surface increases. Thus, similarly, providing of a compact zoom lens system becomes difficult.

Further, for example, in a zoom lens system like the zoom lens system according to Embodiments 3 to 7, it is preferable that the following conditions (6) and (a) are satisfied;

$$0.1 < M_Y/Y_W \times 10^{-3} < 0.4 \quad (6)$$

$$Z = f_T/f_W > 2.5 \quad (a)$$

where, $M_Y$ is the amount of movement in the optical axis direction for the lens unit or lens element that moves in a direction perpendicular to the optical axis in zooming from the wide-angle limit to the telephoto limit, $Y_W$ is the amount of movement at the time of maximum blur compensation for the lens unit or lens element that moves in a direction perpendicular to the optical axis, in a focal length $f_W$ of the entire system at the wide-angle limit, $f_W$ is the focal length of the entire zoom lens system at the wide-angle limit, and $f_T$ is the focal length of the entire zoom lens system at the telephoto limit.

The condition (6) sets forth the amount of movement in the optical axis direction for the lens unit or lens element that moves in a direction perpendicular to the optical axis, relative to the amount of movement at the time of maximum blur compensation for the lens unit or lens element that moves in a direction perpendicular to the optical axis. When the value exceeds the upper limit of the condition (6), the amount of movement in the optical axis direction for the lens unit or lens element that moves in a direction perpendicular to the optical axis increases, and so does the overall length of the zoom lens system. Thus, providing of a compact zoom lens system becomes difficult. In contrast, when the value goes below the lower limit of the condition (6), the amount of lens compensation increases so that excessive compensation can be performed. This can cause degradation in the optical performance.

Further, for example, in a zoom lens system like the zoom lens system according to Embodiments 3 to 7, it is preferable that the following conditions (7) and (a) are satisfied;

$$6.0 < Y_W/I_V \times 10^3 < 9.5 \quad (7)$$

$$Z = f_T/f_W > 2.5 \quad (a)$$

where, $Y_W$ is the amount of movement at the time of maximum blur compensation for the lens unit or lens element that moves in a direction perpendicular to the optical axis, in a focal length $f_W$ of the entire system at the wide-angle limit, $I_V$ is a length of the image sensor in the short side direction $$I_V = 2 \times f_W \times \tan \omega_W \times 0.60,$$

$f_W$ is the focal length of the entire zoom lens system at the wide-angle limit, $\omega_W$ is an incident half view angle at the wide-angle limit, and $f_T$ is the focal length of the entire zoom lens system at the telephoto limit.

The condition (7) sets forth the amount of movement at the time of maximum blur compensation for the lens unit or lens element that moves in a direction perpendicular to the optical axis. When the value exceeds the upper limit of the condition (7), the amount of lens compensation increases so that excessive compensation can be performed. This can cause degradation in the optical performance. In contrast, when the value goes below the lower limit of the condition (7), sufficient compensation of blur such as hand blur becomes difficult.

Further, for example, in a zoom lens system like the zoom lens system according to Embodiments 3 to 7, it is preferable that the following conditions (8) and (a) are satisfied;

$$3.0 < P_W/I_V < 11.0 \quad (8)$$

$$Z = f_T/f_W > 2.5 \quad (a)$$

where, $P_W$ is the optical axial distance between the reflecting surface and an object side principal point of the lens unit or lens element that moves in a direction perpendicular to the optical axis, at the wide-angle limit, $I_V$ is the length of the image sensor in the short side direction $$I_V = 2 \times f_W \times \tan \omega_W \times 0.60,$$

$f_W$ is the focal length of the entire zoom lens system at the wide-angle limit, $\omega_W$ is the incident half view angle at the wide-angle limit, and $f_T$ is the focal length of the entire zoom lens system at the telephoto limit.

The condition (8) sets forth the optical axial distance from the lens element having a reflecting surface to the lens unit or lens element that moves in a direction perpendicular to the optical axis. When the value exceeds the upper limit of the condition (8), the optical axial distance from the lens element having a reflecting surface to the lens unit or lens element that moves in a direction perpendicular to the optical axis increases, and so does the overall length of the zoom lens system. Thus, providing of a compact zoom lens system becomes difficult. In contrast, when the value goes below the lower limit of the condition (8), satisfying of sufficient aberration performance becomes difficult.

Further, for example, in a zoom lens system like the zoom lens system according to Embodiments 3 to 7, it is preferable that the following conditions (9) and (a) are satisfied;

$$0.2 < f_W/H_P < 0.9 \quad (9)$$

$$Z = f_T/f_W > 2.5 \quad (a)$$

where, $H_P$ is the optical axial thickness of the lens element having a reflecting surface, $f_W$ is the focal length of the entire zoom lens system at the wide-angle limit, and $f_T$ is the focal length of the entire zoom lens system at the telephoto limit.

The condition (9) sets forth the size of the lens element having a reflecting surface. When the value exceeds the upper limit of the condition (9), satisfying of sufficient aberration performance becomes difficult. In contrast, when the value goes below the lower limit of the condition (9), the lens element having a reflecting surface becomes large. Thus, providing of a compact zoom lens system becomes difficult.

Further, for example, in a zoom lens system like the zoom lens system according to Embodiments 3 to 7, it is preferable that the following conditions (10) and (a) are satisfied;

$$2.5 < H_P/I_V < 5.0 \quad (10)$$

$$Z = f_T/f_W > 2.5 \quad (a)$$

where, $H_P$ is the optical axial thickness of the lens element having a reflecting surface, $I_V$ is the length of the image sensor in the short side direction $$I_V = 2 \times f_W \times \tan \omega_W \times 0.60,$$

$f_W$ is the focal length of the entire zoom lens system at the wide-angle limit, $\omega_W$ is the incident half view angle at the wide-angle limit, and $f_T$ is the focal length of the entire zoom lens system at the telephoto limit.

The condition (10) sets forth the thickness of the lens element having a reflecting surface. When the value exceeds the upper limit of the condition (10), the thickness increases in the lens element having a reflecting surface. This causes a tendency of increase in the size of the imaging device. In contrast, when the value goes below the lower limit of the condition (10), ensuring of a sufficient thickness of the lens having a reflecting surface becomes difficult.

Here, when at least one of the following conditions (10)' and (10)'' and (a) are satisfied, the above effect is achieved more successfully.

$$2.5 < H_P/I_V < 3.0 \quad (10)'$$

$$4.0 < H_P/I_V < 5.0 \quad (10)''$$

$$Z = f_T/f_W > 2.5 \quad (a)$$

For example, in a zoom lens system composed of four lens units, in order from the object side to the image side, comprising: a first lens unit including a lens element having a reflecting surface and having positive optical power; a second lens unit having negative optical power; a third lens unit having positive optical power; and a fourth lens unit having positive optical power, as in the zoom lens system according to Embodiments 3 to 6, it is preferable that the following conditions (11) and (a) are satisfied;

$$0.5 < -(1-m_{2T}) \times m_{3T} \times m_{4T} < 2.0 \quad (11)$$

$$Z = f_T/f_W > 2.5 \quad (a)$$

where, $m_{2T}$ is a magnification of the second lens unit at the telephoto limit in a case that the shooting distance is infinity, $m_{3T}$ is a magnification of the third lens unit at the telephoto limit in a case that the shooting distance is infinity, $m_{4T}$ is a magnification of the fourth lens unit at the telephoto limit in a case that the shooting distance is infinity, $f_W$ is the focal length of the entire zoom lens system at the wide-angle limit, and $f_T$ is the focal length of the entire zoom lens system at the telephoto limit.

The condition (11) set forth a condition for obtaining satisfactory imaging characteristics at the time of blur compensation. When the value exceeds the upper limit of the condition (11), the amount of decentering in the lens unit or lens element that moves in a direction perpendicular to the optical axis, which is necessary for realizing a predetermined amount of decentering in the image, becomes excessively small. Thus, performing of accurate parallel translation becomes difficult. In contrast, when the value goes below the lower limit of the condition (11), the amount of decentering in the lens unit or lens element that moves in a direction perpendicular to the optical axis, which is necessary for realizing a predetermined amount of decentering in the image, becomes excessively large. This causes a large change in the aberration, and hence causes a tendency of degradation in the imaging characteristics in the periphery of the image.

Here, when at least one of the following conditions (11)' and (11)" and (a) are satisfied, the above effect is achieved more successfully.

$$1.0 < -(1-m_{2T}) \times m_{3T} \times m_{4T} \quad (11)'$$

$$-(1-m_{2T}) \times m_{3T} \times m_{4T} < 1.5 \quad (11)''$$

$$Z = f_T/f_W > 2.5 \quad (a)$$

For example, in a zoom lens system composed of four lens units, in order from the object side to the image side, comprising: a first lens unit including a lens element having a reflecting surface and having positive optical power; a second lens unit having negative optical power; a third lens unit having positive optical power; and a fourth lens unit having positive optical power, as in the zoom lens system according to Embodiments 3 to 6, it is preferable that the following conditions (12) and (a) are satisfied;

$$1.5 < f_1/f_3 < 3.5 \quad (12)$$

$$Z = f_T/f_W > 2.5 \quad (a)$$

where, $f_1$ is the composite focal length of the first lens unit, $f_3$ is a composite focal length of the third lens unit, $f_W$ is the focal length of the entire zoom lens system at the wide-angle limit, and $f_T$ is the focal length of the entire zoom lens system at the telephoto limit.

The condition (12) sets forth the ratio between the composite focal length of the first lens unit and the composite focal length of the third lens unit. When the value exceeds the upper limit of the condition (12), a tendency arises that a larger coma aberration is generated. This situation is undesirable. In contrast, when the value goes below the lower limit of the condition (12), the optical axial thickness of the first lens unit increases, so that providing of a compact zoom lens system becomes difficult.

Here, when at least one of the following conditions (12)' and (12)" and (a) are satisfied, the above effect is achieved more successfully.

$$2.0 < f_1/f_3 \quad (12)'$$

$$f_1/f_3 < 3.0 \quad (12)''$$

$$Z = f_T/f_W > 2.5 \quad (a)$$

For example, in a zoom lens system composed of four lens units, in order from the object side to the image side, comprising: a first lens unit including a lens element having a reflecting surface and having positive optical power; a second lens unit having negative optical power; a third lens unit having positive optical power; and a fourth lens unit having positive optical power, as in the zoom lens system according to Embodiments 3 to 6, it is preferable that the following conditions (13) and (a) are satisfied;

$$1.0 < -f_1/f_2 < 4.0 \quad (13)$$

$$Z = f_T/f_W > 2.5 \quad (a)$$

where, $f_1$ is the composite focal length of the first lens unit, $f_2$ is a composite focal length of the second lens unit, $f_W$ is the focal length of the entire zoom lens system at the wide-angle limit, and $f_T$ is the focal length of the entire zoom lens system at the telephoto limit.

The condition (13) sets forth the ratio between the composite focal length of the first lens unit and the composite focal length of the second lens unit. When the value exceeds the upper limit of the condition (13), aberration fluctuation becomes large in the entire zoom lens system. This situation is undesirable. In contrast, when the value goes below the lower limit of the condition (13), the optical axial thickness of the first lens unit increases, so that providing of a compact zoom lens system becomes difficult.

Here, when at least one of the following conditions (13)' and (13)" and (a) are satisfied, the above effect is achieved more successfully.

$$1.0 < -f_1/f_2 < 1.5 \quad (13)'$$

$$2.5 < -f_1/f_2 < 4.0 \quad (13)''$$

$$Z = f_T/f_W > 2.5 \quad (a)$$

For example, in a zoom lens system, in order from the object side to the image side, comprising: a first lens unit having positive optical power; a second lens unit having negative optical power; a third lens unit having positive optical power; and a fourth lens unit having positive optical power, as in the zoom lens system according to Embodiments 3 to 6, it is preferable that the following conditions (14) and (a) are satisfied;

$$2.5 < f_4/f_W < 4.5 \quad (14)$$

$$Z = f_T/f_W > 2.5 \quad (a)$$

where, $f_4$ is a composite focal length of the fourth lens unit, $f_W$ is the focal length of the entire zoom lens system at the wide-angle limit, and $f_T$ is the focal length of the entire zoom lens system at the telephoto limit.

The condition (14) sets forth the focal length of the fourth lens unit. When the value exceeds the upper limit of the condition (14), it becomes difficult that spherical aberration and surface curvature are compensated with satisfactory balance in the entire zoom lens system. In contrast, when the value goes below the lower limit of the condition (14), a tendency arises that the amount of movement at the time of focusing becomes large.

Here, when at least one of the following conditions (14)' and (14)" and (a) are satisfied, the above effect is achieved more successfully.

$$3.0 < f_4/f_W \quad (14)'$$

$$f_4/f_W < 3.5 \quad (14)''$$

$$Z = f_T/f_W > 2.5 \quad (a)$$

For example, in a zoom lens system, in order from the object side to the image side, comprising: a first lens unit having positive optical power; a second lens unit having negative optical power; a third lens unit having positive optical power; and a fourth lens unit having positive optical power, as in the zoom lens system according to Embodiments 3 to 6, it is preferable that the following conditions (15) and (a) are satisfied;

$$0.9 < \beta_{T4}/\beta_{W4} < 1.2 \quad (15)$$

$$Z = f_T/f_W > 2.5 \quad (a)$$

where, $\beta_{T4}$ is a magnification of the fourth lens unit in the infinity in-focus condition at the telephoto limit, $\beta_{W4}$ is a magnification of the fourth lens unit in the infinity in-focus condition at the wide-angle limit, $f_T$ is the focal length of the entire zoom lens system at the telephoto limit, and $f_W$ is the focal length of the entire zoom lens system at the wide-angle limit.

The condition (15) sets forth the magnification variation in the fourth lens unit, and hence sets forth zoom contribution of the fourth lens unit. When the value exceeds the upper limit of the condition (15), it becomes difficult that aberration is compensated in the entire zoom lens system with satisfactory balance. In contrast, when the value goes below the lower limit of the condition (15), a desired zoom ratio becomes difficult to be obtained.

Here, when the following conditions (15)' and (a) are satisfied, the above effect is achieved more successfully.

$$1.0 < \beta_{T4}/\beta_{W4} \quad (15)'$$

$$Z = f_T/f_W > 2.5 \quad (a)$$

For example, in a zoom lens system, in order from the object side to the image side, comprising: a first lens unit having positive optical power; a second lens unit having negative optical power; a third lens unit having positive optical power; and a fourth lens unit having positive optical power, as in the zoom lens system according to Embodiments 3 to 6, it is preferable that the following conditions (16) and (a) are satisfied;

$$0.5 < f_3/f_4 < 1.2 \quad (16)$$

$$Z = f_T/f_W > 2.5 \quad (a)$$

where, $f_3$ is the composite focal length of the third lens unit, $f_4$ is the composite focal length of the fourth lens unit, $f_W$ is the focal length of the entire zoom lens system at the wide-angle limit, and $f_T$ is the focal length of the entire zoom lens system at the telephoto limit.

The condition (16) sets forth the ratio of the focal lengths of the third lens unit and the fourth lens unit, and hence sets forth the function of each lens unit in zooming. When the value exceeds the upper limit of the condition (16), zooming effect decreases in the third lens unit. Thus, a desired zoom ratio becomes difficult to be obtained. In contrast, when the value goes below the lower limit of the condition (16), it becomes difficult that astigmatism is compensated in the entire zoom lens system.

Here, when at least one of the following conditions (16)' and (16)" and (a) are satisfied, the above effect is achieved more successfully.

$$0.5 < f_3/f_4 < 0.8 \quad (16)'$$

$$1.0 < f_3/f_4 < 1.2 \quad (16)''$$

$$Z = f_T/f_W > 2.5 \quad (a)$$

The zoom lens system according to Embodiments 3 to 6 is a zoom lens system having a four-unit construction of positive, negative, positive and positive, and in order from the object side to the image side, comprising: a first lens unit G1 having positive optical power; a second lens unit G2 having negative optical power; a diaphragm A; a third lens unit G3 having positive optical power; and a fourth lens unit G4 having positive optical power. Further, the zoom lens system according to Embodiment 7 is a zoom lens system having a three-unit construction of negative, positive and positive, and in order from the object side to the image side, comprising: a first lens unit G1 having negative optical power; a diaphragm A; a second lens unit G2 having positive optical power; and a third lens unit G3 having positive optical power. However, the present invention is not limited to these constructions. That is, various constructions are employable like a three-unit construction of negative, positive and negative, a three-unit construction of positive, negative and positive, a four-unit construction of positive, negative, positive and negative, and a five-unit construction of positive, negative, positive, negative and positive. Such zoom lens systems can suitably be employed in the imaging device, for example, shown in Embodiments 1 and 2.

Here, the lens units constituting the zoom lens system of Embodiments 3 to 7 are composed exclusively of refractive type lens elements that deflect the incident light by refraction (that is, lens elements of a type in which deflection is achieved at the interface between media each having a distinct refractive index). However, the present invention is not limited to the zoom lens system of this construction. For example, the lens units may employ diffractive type lens elements that deflect the incident light by diffraction; refractive-diffractive hybrid type lens elements that deflect the incident light by a combination of diffraction and refraction; or gradient index type lens elements that deflect the incident light by distribution of refractive index in the medium.

An imaging device comprising a zoom lens system according to Embodiments 3 to 7 described above and an image sensor such as a CCD or a CMOS may be applied to a mobile telephone, a PDA (Personal Digital Assistance), a surveillance camera in a surveillance system, a Web camera, a vehicle-mounted camera or the like.

Further, the construction of the digital still camera and the zoom lens system according to Embodiments 3 to 7 described above is applicable also to a digital video camera for moving images. In this case, moving images with high resolution can be acquired in addition to still images.

Hereinafter, numerical examples which are actual implementations of the zoom lens systems according to Embodiments 3 to 7 will be described. In the numerical examples, the units of the length in the tables are all "mm". Moreover, in the numerical examples, r is the radius of curvature, d is the axial distance, nd is the refractive index to the d-line, and νd is the Abbe number to the d-line. In the numerical examples, the surfaces marked with * are aspherical surfaces, and the aspherical surface configuration is defined by the following expression.

$$Z = \frac{h^2/r}{1 + \sqrt{1 - (1+\kappa)(h/r)^2}} + Dh^4 + Eh^6 + Fh^8 + Gh^{10}$$

Here, κ is the conic constant, D, E, F and G are a fourth-order, sixth-order, eighth-order and tenth-order aspherical coefficients, respectively.

FIGS. 3A to 3I are longitudinal aberration diagrams of a zoom lens system according to Example 1. FIGS. 6A to 6I are longitudinal aberration diagrams of a zoom lens system according to Example 2. FIGS. 9A to 9I are longitudinal aberration diagrams of a zoom lens system according to Example 3. FIGS. 12A to 12I are longitudinal aberration diagrams of a zoom lens system according to Example 4. FIGS. 15A to 15I are longitudinal aberration diagrams of a zoom lens system according to Example 5.

FIGS. 3A to 3C, 6A to 6C, 9A to 9C, 12A to 12C, and 15A to 15C show the longitudinal aberration at the wide-angle limit. FIGS. 3D to 3F, 6D to 6F, 9D to 9F, 12D to 12F, and 15D to 15F show the longitudinal aberration at the middle position. FIGS. 3G to 3I, 6G to 6I, 9G to 9I, 12G to 12I, and 15G to 15I show the longitudinal aberration at the telephoto limit. FIGS. 3A, 3D, 3G, 6A, 6D, 6G, 9A, 9D, 9G, 12A, 12D, 12G, 15A, 15D and 15G are spherical aberration diagrams. FIGS. 3B, 3E, 3H, 6B, 6E, 6H, 9B, 9E, 9H, 12B, 12E, 12H, 15B, 15E and 15H are astigmatism diagrams. FIGS. 3C, 3F, 3I, 6C, 6F, 6I, 9C, 9F, 9I, 12C, 12F, 12I, 15C, 15F and 15I are distortion diagrams. In each spherical aberration diagram, the vertical axis indicates the F-number, and the solid line, the short dash line and the long dash line indicate the characteristics to the d-line, the F-line and the C-line, respectively. In each astigmatism diagram, the vertical axis indicates the half view angle, and the solid line and the dash line indicate the characteristics to the sagittal image plane (in each Fig., indicated as "s") and the meridional image plane (in each Fig., indicated as "m"), respectively. In each distortion diagram, the vertical axis indicates the half view angle.

FIGS. 4A to 4F are lateral aberration diagrams of a zoom lens system according to Example 1 at the telephoto limit. FIGS. 7A to 7F are lateral aberration diagrams of a zoom lens system according to Example 2 at the telephoto limit. FIGS. 10A to 10F are lateral aberration diagrams of a zoom lens system according to Example 3 at the telephoto limit. FIGS. 13A to 13F are lateral aberration diagrams of a zoom lens system according to Example 4 at the telephoto limit. FIGS. 16A to 16F are lateral aberration diagrams of a zoom lens system according to Example 5 at the telephoto limit.

Figure 16A:
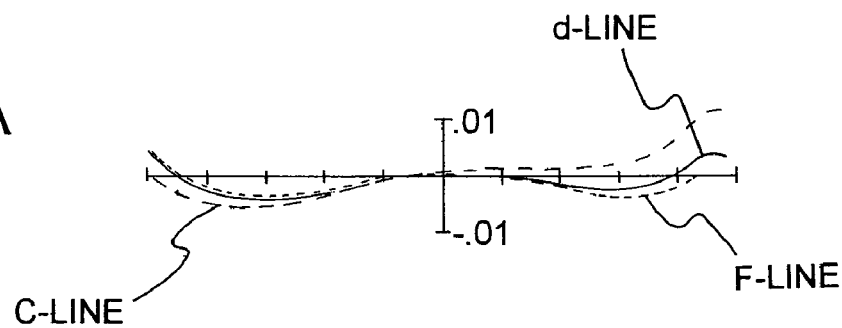
FIGS. 16A to 16F are lateral aberration diagrams of a zoom lens system according to Example 5 at a telephoto limit.
Figure 16B:
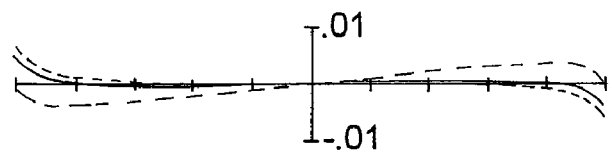
Figure 16C:
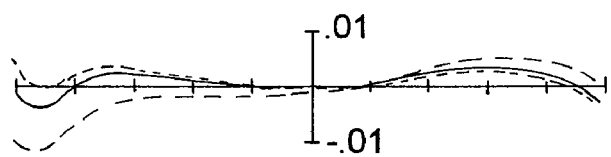
Figure 16D:
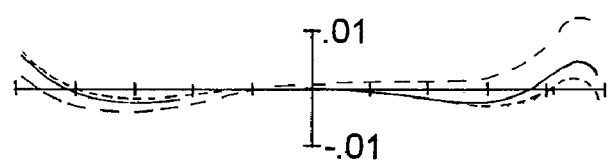
Figure 16E:
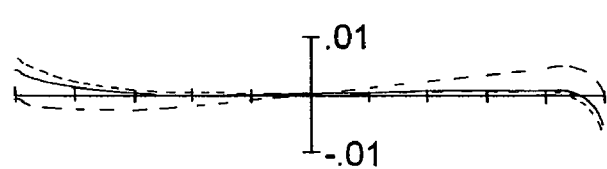
Figure 16F:
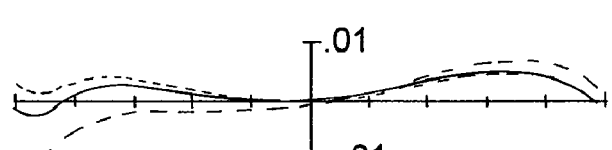

FIGS. 4A to 4C, 7A to 7C, 10A to 10C, 13A to 13C, and 16A to 16C are lateral aberration diagrams at the telephoto limit corresponding to a basic state that image blur compensation is not performed. FIGS. 4D to 4F, 7D to 7F, 10D to 10F, and 13D to 13F are lateral aberration diagrams corresponding to an image blur compensation state at the telephoto limit in which the entirety of the third lens unit G3 is moved by a predetermined amount in a direction perpendicular to the optical axis. FIGS. 16D to 16F are lateral aberration diagrams corresponding to an image blur compensation state at the telephoto limit in which the entirety of the second lens unit G2 is moved by a predetermined amount in a direction perpendicular to the optical axis. Among the lateral aberration diagrams corresponding to the basic state, FIGS. 4A, 7A, 10A, 13A and 16A show the lateral aberration at an image point at 75% of the maximum image height. FIGS. 4B, 7B, 10B, 13B and 16B show the lateral aberration at the axial image point. FIGS. 4C, 7C, 10C, 13C and 16C show the lateral aberration at an image point at −75% of the maximum image height. Among the lateral aberration diagrams corresponding to the image blur compensation state, FIGS. 4D, 7D, 10D, 13D and 16D show the lateral aberration at an image point at 75% of the maximum image height. FIGS. 4E, 7E, 10E, 13E and 16E show the lateral aberration at the axial image point. FIGS. 4F, 7F, 10F, 13F and 16F show the lateral aberration at an image point at −75% of the maximum image height. In each lateral aberration diagram, the horizontal axis indicates the distance from the principal ray on the pupil surface, and the solid line, the short dash line and the long dash line indicate the characteristics to the d-line, the F-line and the C-line, respectively. In the lateral aberration diagrams of FIGS. 4A to 4F, 7A to 7F, 10A to 10F, and 13A to 13F, the meridional image plane is adopted as the plane containing the optical axis of the first lens unit G1 and the optical axis of the third lens unit G3. In the lateral aberration diagram of FIGS. 16A to 16F, the meridional image plane is adopted as the plane containing the optical axis of the first lens unit G1 and the optical axis of the second lens unit G2.

Here, the amount of movement in a direction perpendicular to the optical axis of the third lens unit G3 in the image blur compensation state is 0.096 mm in Example 1, 0.094 mm in Example 2, 0.140 mm in Example 3, and 0.100 mm in Example 4. The amount of movement in a direction perpendicular to the optical axis of the second lens unit G2 in the image blur compensation state in Example 5 is 0.059 mm. Here, the amount of image decentering in a case that the zoom lens system inclines by 0.3° when the shooting distance is infinity at the telephoto limit is equal to the amount of image decentering in a case that the entirety of the third lens unit G3 or the entirety of the second lens unit G2 moves in parallel in a direction perpendicular to the optical axis by each of the above values.

As seen from the lateral aberration diagrams, satisfactory symmetry is obtained in the lateral aberration at the axial image point. Further, when the lateral aberration at the +75% image point and the lateral aberration at the −75% image point are compared with each other in the basic state, all have a small degree of curvature and almost the same inclination in the aberration curve. Thus, decentering coma aberration and decentering astigmatism are small. This indicates that sufficient imaging performance is obtained even in the image blur compensation state. Further, when the image blur compensation angle of a zoom lens system is the same, the amount of parallel movement required for image blur compensation decreases with decreasing focal length of the entire zoom lens system. Thus, at arbitrary zoom positions, sufficient image blur compensation can be performed for image blur compensation angles up to 0.3° without degrading the imaging characteristics.

EXAMPLE 1

A zoom lens system of Example 1 corresponds to that of Embodiment 3 shown in FIGS. 2A to 2C. Table 1 shows the lens data of the zoom lens system of Example 1. Table 2 shows the focal length, the F-number, the half view angle, the optical overall length and the variable axial distance data, when the shooting distance is infinity. Table 3 shows the aspherical data.

TABLE 1

| Lens unit | Lens element | Surface | r | d | nd | vd |
|---|---|---|---|---|---|---|
| G1 | L1 | 1 | 26.433 | 1.000 | 1.84666 | 23.8 |
|    |    | 2 | 13.068 | 4.195 |  |  |
|    | L2 | 3 | ∞ | 12.000 | 1.84666 | 23.8 |
|    |    | 4 | ∞ | 0.300 |  |  |
|    | L3 | 5 | 30.525 | 3.323 | 1.72916 | 54.7 |
|    |    | 6 | −28.970 | Variable |  |  |
| G2 | L4 | 7 | −17.932* | 0.800 | 1.66547 | 55.2 |
|    |    | 8 | 7.149* | 0.792 |  |  |
|    | L5 | 9 | 8.668 | 2.300 | 1.84666 | 23.8 |
|    |    | 10 | 17.616 | Variable |  |  |
| Diaphragm |  | 11 | ∞ | 1.900 |  |  |
| G3 | L6 | 12 | 7.079 | 1.800 | 1.72916 | 54.7 |
|    |    | 13 | 770.451 | 1.619 |  |  |
|    | L7 | 14 | 9.327* | 1.900 | 1.66547 | 55.2 |
|    | L8 | 15 | −28.836 | 0.700 | 1.84666 | 23.8 |
|    |    | 16 | 5.490 | Variable |  |  |
| G4 | L9 | 17 | 8.399* | 2.150 | 1.80470 | 41.0 |
|    |    | 18 | 18.335 | Variable |  |  |
| P |  | 19 | ∞ | 2.100 | 1.51680 | 64.2 |
|    |    | 20 | ∞ | — |  |  |

TABLE 2

| Axial distance | Wide-angle limit | Middle position | Telephoto limit |
|---|---|---|---|
| d6 | 0.700 | 10.040 | 15.843 |
| d10 | 20.000 | 9.212 | 0.300 |
| d16 | 7.142 | 7.290 | 10.899 |
| d18 | 0.998 | 2.299 | 1.790 |
| f | 5.81 | 11.61 | 23.19 |
| F | 2.86 | 3.01 | 3.50 |
| ω | 33.58 | 16.83 | 8.62 |

TABLE 3

| Surface | κ | D | E | F | G |
|---|---|---|---|---|---|
| 7 | 0.00E+00 | 2.35E−04 | −1.65E−06 | −2.82E−08 | 3.95E−10 |
| 8 | 0.00E+00 | 9.38E−05 | −1.74E−06 | 9.24E−09 | −4.00E−09 |
| 14 | 0.00E+00 | −7.14E−04 | 8.27E−07 | −6.21E−06 | 4.36E−07 |
| 17 | 0.00E+00 | −3.47E−05 | 1.77E−06 | 2.34E−08 | 2.22E−10 |

EXAMPLE 2

A zoom lens system of Example 2 corresponds to that of Embodiment 4 shown in FIGS. 5A to 5C. Table 4 shows the lens data of the zoom lens system of Example 2. Table 5 shows the focal length, the F-number, the half view angle, the optical overall length and the variable axial distance data, when the shooting distance is infinity. Table 6 shows the aspherical data.

TABLE 4

| Lens unit | Lens element | Surface | r | d | nd | vd |
|---|---|---|---|---|---|---|
| G1 | L1 | 1 | 31.796 | 1.000 | 1.84666 | 23.8 |
|    |    | 2 | 22.088 | 6.895 |  |  |
|    | L2 | 3 | ∞ | 19.000 | 1.84666 | 23.8 |
|    |    | 4 | ∞ | 0.300 |  |  |
|    | L3 | 5 | 23.158 | 3.891 | 1.72916 | 54.7 |
|    |    | 6 | 286.387 | Variable |  |  |
| G2 | L4 | 7 | 21.533 | 1.000 | 1.80610 | 33.3 |
|    |    | 8 | 8.481 | 4.626 |  |  |
|    | L5 | 9 | −24.301* | 0.800 | 1.66547 | 55.2 |
|    |    | 10 | 14.139* | 0.792 |  |  |
|    | L6 | 11 | 16.605 | 2.300 | 1.84666 | 23.8 |
|    |    | 12 | −188.578 | Variable |  |  |
| Diaphragm |  | 13 | ∞ | 1.900 |  |  |
| G3 | L7 | 14 | 8.227 | 1.800 | 1.72916 | 54.7 |
|    |    | 15 | 596.126 | 1.619 |  |  |
|    | L8 | 16 | 8.336* | 1.900 | 1.66547 | 55.2 |
|    | L9 | 17 | −89.535 | 0.700 | 1.84666 | 23.8 |
|    |    | 18 | 5.717 | Variable |  |  |
| G4 | L10 | 19 | 10.386* | 2.150 | 1.80470 | 41.0 |
|    |    | 20 | 20.893 | Variable |  |  |
| P |  | 21 | ∞ | 2.100 | 1.51680 | 64.2 |
|    |    | 22 | ∞ | — |  |  |

TABLE 5

| Axial distance | Wide-angle limit | Middle position | Telephoto limit |
|---|---|---|---|
| d6 | 0.800 | 10.802 | 16.304 |
| d12 | 23.001 | 10.791 | 0.300 |
| d18 | 4.470 | 6.016 | 10.702 |
| d20 | 3.139 | 3.795 | 4.109 |
| f | 5.83 | 11.60 | 23.19 |
| F | 2.82 | 3.14 | 3.84 |
| ω | 32.89 | 17.38 | 8.77 |

TABLE 6

| Surface | κ | D | E | F | G |
|---|---|---|---|---|---|
| 9 | 0.00E+00 | −2.36E−04 | 9.10E−06 | −1.16E−07 | 3.13E−10 |
| 10 | 0.00E+00 | −2.45E−04 | 9.51E−06 | −1.11E−07 | 1.95E−11 |
| 16 | 0.00E+00 | −3.68E−04 | −7.08E−06 | −8.59E−07 | 3.71E−08 |
| 19 | 0.00E+00 | −7.40E−05 | 1.70E−06 | −6.65E−08 | 1.54E−09 |

EXAMPLE 3

A zoom lens system of Example 3 corresponds to that of Embodiment 5 shown in FIGS. 8A to 8C. Table 7 shows the lens data of the zoom lens system of Example 3. Table 8 shows the focal length, the F-number, the half view angle, the optical overall length and the variable axial distance data, when the shooting distance is infinity. Table 9 shows the aspherical data.

TABLE 7

| Lens unit | Lens element | Surface | r | d | nd | vd |
|---|---|---|---|---|---|---|
| G1 | L1 | 1 | 31.342 | 1.000 | 1.84666 | 23.8 |
|  |  | 2 | 24.108 | 9.041 |  |  |
|  | L2 | 3 | ∞ | 21.999 | 1.84666 | 23.8 |
|  |  | 4 | ∞ | 0.300 |  |  |
|  | L3 | 5 | 26.664 | 3.694 | 1.72916 | 54.7 |
|  |  | 6 | −3977.414 | Variable |  |  |
| G2 | L4 | 7 | 20.695 | 1.000 | 1.80610 | 33.3 |
|  |  | 8 | 8.587 | 4.296 |  |  |
|  | L5 | 9 | −32.379* | 0.800 | 1.66547 | 55.2 |
|  |  | 10 | 15.056* | 0.792 |  |  |
|  | L6 | 11 | 14.436 | 2.300 | 1.84666 | 23.8 |
|  |  | 12 | 80.361 | Variable |  |  |
| Diaphragm |  | 13 | ∞ | 0.900 |  |  |
| G3 | L7 | 14 | 7.837 | 1.800 | 1.72916 | 54.7 |
|  |  | 15 | 78.733 | 1.619 |  |  |
|  | L8 | 16 | 9.314* | 1.900 | 1.66547 | 55.2 |
|  | L9 | 17 | 3273.257 | 0.700 | 1.84666 | 23.8 |
|  |  | 18 | 5.670 | Variable |  |  |
| G4 | L10 | 19 | 8.483* | 2.150 | 1.80470 | 41.0 |
|  |  | 20 | 18.884 | Variable |  |  |
| P |  | 21 | ∞ | 2.100 | 1.51680 | 64.2 |
|  |  | 22 | ∞ | — |  |  |

TABLE 8

| Axial distance | Wide-angle limit | Middle position | Telephoto limit |
|---|---|---|---|
| d6 | 0.800 | 9.981 | 17.251 |
| d12 | 28.037 | 15.627 | 0.687 |
| d18 | 3.211 | 6.211 | 13.852 |
| d20 | 4.200 | 4.422 | 4.458 |
| f | 5.83 | 11.59 | 28.99 |
| F | 2.84 | 3.24 | 4.16 |
| ω | 33.05 | 17.58 | 7.30 |

TABLE 9

| Surface | κ | D | E | F | G |
|---|---|---|---|---|---|
| 9 | 0.00E+00 | −2.55E−04 | 9.37E−06 | −1.24E−07 | 5.37E−10 |
| 10 | 0.00E+00 | −2.12E−04 | 9.18E−06 | −8.61E−08 | −9.73E−12 |
| 16 | 0.00E+00 | −3.65E−04 | −1.10E−05 | −1.72E−07 | 4.51E−09 |
| 19 | 0.00E+00 | −5.61E−05 | 2.15E−06 | −7.85E−08 | 1.23E−09 |

EXAMPLE 4

A zoom lens system of Example 4 corresponds to that of Embodiment 6 shown in FIGS. 11A to 11C. Table 10 shows the lens data of the zoom lens system of Example 4. Table 11 shows the focal length, the F-number, the half view angle, the optical overall length and the variable axial distance data, when the shooting distance is infinity. Table 12 shows the aspherical data.

TABLE 10

| Lens unit | Lens element | Surface | r | d | nd | vd |
|---|---|---|---|---|---|---|
| G1 | L1 | 1 | 26.145 | 1 | 1.84666 | 23.8 |
|  |  | 2 | 19.462 | 9.241 |  |  |
|  | L2 | 3 | ∞ | 20 | 1.84666 | 23.8 |
|  |  | 4 | ∞ | 0.3 |  |  |
|  | L3 | 5 | 26.445 | 4.025 | 1.72000 | 50.3 |
|  |  | 6 | −195.628 | Variable |  |  |
| G2 | L4 | 7 | 44.928 | 1 | 1.80610 | 33.3 |
|  |  | 8 | 8.149 | 4.685 |  |  |
|  | L5 | 9 | −30.882* | 0.8 | 1.66547 | 55.2 |
|  |  | 10 | 31.268* | 0.792 |  |  |
|  | L6 | 11 | 22.734 | 2.3 | 1.84666 | 23.8 |
|  |  | 12 | −62.669 | Variable |  |  |
| Diaphragm |  | 13 | ∞ | 0.9 |  |  |
| G3 | L7 | 14 | 17.19 | 4.003 | 1.72916 | 54.7 |
|  |  | 15 | −51.573 | 1.619 |  |  |
|  | L8 | 16 | 7.269* | 2.498 | 1.66547 | 55.2 |
|  | L9 | 17 | −1747.278 | 0.7 | 1.84666 | 23.8 |
|  |  | 18 | 5.832 | Variable |  |  |
| G4 | L10 | 19 | 7.982* | 2.15 | 1.80470 | 41.0 |
|  |  | 20 | 15.306 | Variable |  |  |
| P |  | 21 | ∞ | 2.100 | 1.51680 | 64.2 |
|  |  | 22 | ∞ | — |  |  |

TABLE 11

| Axial distance | Wide-angle limit | Middle position | Telephoto limit |
|---|---|---|---|
| d6 | 0.800 | 9.959 | 17.001 |
| d12 | 26.002 | 12.580 | 0.455 |
| d18 | 0.799 | 5.097 | 11.028 |
| d20 | 5.991 | 5.952 | 5.115 |
| f | 5.84 | 11.60 | 23.19 |
| F | 2.87 | 3.29 | 3.83 |
| ω | 33.45 | 18.01 | 9.17 |

TABLE 12

| Surface | κ | D | E | F | G |
|---|---|---|---|---|---|
| 9 | 0.00E+00 | −2.54E−04 | 1.08E−05 | −7.97E−08 | −3.59E−10 |
| 10 | 0.00E+00 | −2.47E−04 | 1.11E−05 | −1.05E−07 | −2.62E−10 |
| 16 | 0.00E+00 | 2.56E−05 | −1.53E−05 | 2.75E−06 | −1.65E−07 |
| 19 | 0.00E+00 | −9.85E−05 | 1.04E−06 | −5.24E−08 | 5.15E−10 |

EXAMPLE 5

A zoom lens system of Example 5 corresponds to that of Embodiment 7 shown in FIGS. 14A to 14C. Table 13 shows the lens data of the zoom lens system of Example 5. Table 14 shows the focal length, the F-number, the half view angle, the optical overall length and the variable axial distance data, when the shooting distance is infinity. Table 15 shows the aspherical data.

TABLE 13

| Lens unit | Lens element | Surface | r | d | nd | νd |
|---|---|---|---|---|---|---|
| G1 | L1 | 1 | −21.299 | 0.800 | 1.80470 | 41.0 |
|  |  | 2 | 10.906* | 0.969 |  |  |
|  | L2 | 3 | ∞ | 8.000 | 1.84666 | 23.8 |
|  |  | 4 | ∞ | 0.000 |  |  |
|  | L3 | 5 | 38.692 | 1.400 | 1.84666 | 23.8 |
|  |  | 6 | −44.535 | Variable |  |  |
| Diaphragm |  | 7 | ∞ | 0.900 |  |  |
| G2 | L4 | 8 | 4.830* | 1.350 | 1.80470 | 41.0 |
|  |  | 9 | 73.288 | 0.300 |  |  |
|  | L5 | 10 | 9.794 | 0.900 | 1.69680 | 55.5 |
|  | L6 | 11 | 53.632 | 0.400 | 1.80518 | 25.5 |
|  |  | 12 | 3.392 | Variable |  |  |
| G3 | L7 | 13 | 13.347* | 1.810 | 1.60602 | 57.4 |
|  |  | 14 | −16.862* | Variable |  |  |
| P |  | 15 | ∞ | 0.900 | 1.51680 | 64.2 |
|  |  | 16 | ∞ | — |  |  |

TABLE 14

| Axial distance | Wide-angle limit | Middle position | Telephoto limit |
|---|---|---|---|
| d6 | 14.008 | 8.080 | 0.821 |
| d12 | 3.688 | 11.120 | 19.641 |
| d14 | 4.151 | 2.639 | 1.380 |
| f | 6.420 | 10.050 | 17.090 |
| F | 3.33 | 4.60 | 6.55 |
| ω | 30.89 | 19.77 | 11.77 |

TABLE 15

| Surface | κ | D | E | F | G |
|---|---|---|---|---|---|
| 2 | 2.20E+00 | −5.38E−04 | −4.61E−06 | 7.64E−08 | −6.47E−09 |
| 8 | −5.60E−01 | 6.59E−06 | 1.14E−05 | −2.31E−06 | 1.75E−07 |
| 13 | −1.59E+01 | 1.39E−03 | −8.03E−05 | 2.89E−06 | −6.19E−08 |
| 14 | 2.65E+00 | 1.13E−03 | −7.44E−05 | 2.55E−06 | −5.01E−08 |

The corresponding values to the above conditions are listed in the following Table 16.

TABLE 16

| | Example | | | | |
|---|---|---|---|---|---|
| Condition | 1 | 2 | 3 | 4 | 5 |
| (1) $P_W/Y_W \times 10^{-3}$ | 1.08 | 1.40 | 1.20 | 1.30 | 0.34 |
| (2) $f_1/Y_W \times 10^{-3}$ | 1.06 | 1.39 | 1.07 | 1.12 | 0.52 |
| (3) $PF/Y_W \times 10^{-3}$ | 0.61 | 0.87 | 0.82 | 0.89 | 0.23 |
| (4) $H_P/H_Y$ | 1.99 | 3.16 | 3.66 | 5.00 | 2.71 |
| (5) $M_Y/H_P$ | 0.38 | 0.38 | 0.50 | 0.47 | 1.65 |
| (6) $M_Y/Y_W \times 10^{-3}$ | 0.16 | 0.23 | 0.28 | 0.27 | 0.31 |
| (7) $Y_W/I_V \times 10^3$ | 6.05 | 6.85 | 8.57 | 7.34 | 9.11 |
| (8) $P_W/I_V$ | 6.54 | 9.60 | 10.29 | 9.57 | 3.14 |
| (9) $f_W/H_P$ | 0.48 | 0.31 | 0.27 | 0.29 | 0.80 |
| (10) $H_P/I_V$ | 2.59 | 4.20 | 4.83 | 4.32 | — |
| (11) $-(1 - m_{2T}) \times m_{3T} \times m_{4T}$ | 1.41 | 1.20 | 1.29 | 1.02 | — |
| (12) $f_1/f_3$ | 2.21 | 2.91 | 2.37 | 1.78 | — |
| (13) $-f_1/f_2$ | 2.31 | 3.10 | 2.86 | 2.30 | — |
| (14) $f_4/f_W$ | 3.02 | 4.04 | 3.01 | 3.14 | — |
| (15) $\beta_{T4}/\beta_{W4}$ | 0.93 | 0.94 | 0.97 | 1.11 | — |
| (16) $f_3/f_4$ | 0.77 | 0.63 | 1.01 | 1.16 | — |

The zoom lens system according to the present invention is applicable to a digital input device such as a digital still camera, a digital video camera, a mobile telephone, a PDA (Personal Digital Assistance), a surveillance camera in a surveillance system, a Web camera or a vehicle-mounted camera. In particular, the present zoom lens system is suitable for a camera such as a digital still camera or a digital video camera requiring high image quality.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A zoom lens system, in order from an object side to an image side, comprising:

a first lens unit having positive optical power;
a second lens unit having negative optical power;
a third lens unit having positive optical power; and
a fourth lens unit having positive optical power, wherein each of the lens units is composed of at least one lens element, an interval between at least any two lens units among the lens units is changed so that an optical image of an object is formed with a continuously variable magnification, the first lens unit includes a lens element having a reflecting surface for bending a light beam from the object, and any one of the lens units, any one of the lens elements, or alternatively a plurality of adjacent lens elements that constitute one lens unit move in a direction perpendicular to an optical axis.

2. The zoom lens system as claimed in claim 1, wherein any one of the lens units other than the first lens unit, any one of the lens elements other than the lens element having a reflecting surface, or alternatively a plurality of adjacent lens elements that are other than the lens element having a reflecting surface and that constitute one lens unit move in a direction perpendicular to the optical axis.

3. The zoom lens system as claimed in claim 1, wherein any one of the lens units or alternatively a plurality of adjacent lens elements constituting one lens unit, which move in a direction perpendicular to the optical axis, are composed of three lens elements.

4. The zoom lens system as claimed in claim 1, wherein the reflecting surface bends by approximately 90° an axial principal ray from the object.

5. The zoom lens system as claimed in claim 1, wherein the lens element having a reflecting surface is a prism.

6. The zoom lens system as claimed in claim 5, wherein the prism has optical power.

7. The zoom lens system as claimed in claim 1, wherein the lens element having a reflecting surface is a mirror.

8. The zoom lens system as claimed in claim 1, wherein the first lens unit, in order from the object side to the image side, comprises:

a lens element having negative optical power;
a lens element having a reflecting surface; and
subsequent lens elements including at least one lens element and having positive optical power.

9. The zoom lens system as claimed in claim 1, satisfying the following conditions (1) and (a):

$$0.2 < P_W/Y_W \times 10^{-3} < 1.7 \qquad (1)$$

$$Z = f_T/f_W > 2.5 \qquad (a)$$

wherein, $P_W$ is an optical axial distance between the reflecting surface and an object side principal point of the lens unit or lens element that moves in a direction perpendicular to the optical axis, at the wide-angle limit, $Y_W$ is an amount of movement at the time of maximum blur compensation for the lens unit or lens element that moves in a direction perpendicular to the optical axis, in a focal length $f_W$ of the entire system at the wide-angle limit, $f_W$ is a focal length of the entire zoom lens system at a wide-angle limit, and $f_T$ is a focal length of the entire zoom lens system at a telephoto limit.

10. The zoom lens system as claimed in claim 1, satisfying the following conditions (2) and (a):

$$0.4 < f_1/Y_W \times 10^{-3} < 1.5 \qquad (2)$$

$$Z = f_T/f_W > 2.5 \qquad (a)$$

wherein, $f_1$ is a composite focal length of the first lens unit, $Y_W$ is the amount of movement at the time of maximum blur compensation for the lens unit or lens element that moves in a direction perpendicular to the optical axis, in a focal length $f_W$ of the entire system at the wide-angle limit, $f_W$ is the focal length of the entire zoom lens system at a wide-angle limit, and $f_T$ is the focal length of the entire zoom lens system at a telephoto limit.

11. The zoom lens system as claimed in claim 1, satisfying the following conditions (3) and (a):

$$0.1 < PF/Y_W \times 10^{-3} < 1.0 \qquad (3)$$

$$Z = f_T/f_W > 2.5 \qquad (a)$$

wherein,

PF is an optical axial distance from a position on the most object side on the optical axis of a lens element located on the most object side to a position on the most image side on the optical axis of the lens element having a reflecting surface, $Y_W$ is the amount of movement at the time of maximum blur compensation for the lens unit or lens element that moves in a direction perpendicular to the optical axis, in a focal length $f_W$ of the entire system at the wide-angle limit, $f_W$ is the focal length of the entire zoom lens system at a wide-angle limit, and $f_T$ is the focal length of the entire zoom lens system at a telephoto limit.

12. The zoom lens system as claimed in claim 1, satisfying the following condition (4):

$$1.0 < H_P/H_Y < 6.0 \qquad (4)$$

wherein, $H_P$ is an optical axial thickness of the lens element having a reflecting surface, and $H_Y$ is an optical axial thickness of the lens unit or lens element that moves in a direction perpendicular to the optical axis.

13. The zoom lens system as claimed in claim 1, satisfying the following condition (5):

$$0.3 < M_Y/H_P < 0.6 \qquad (5)$$

wherein, $M_Y$ is an amount of movement in the optical axis direction for the lens unit or lens element that moves in a direction perpendicular to the optical axis in zooming from the wide-angle limit to the telephoto limit, and $H_P$ is the optical axial thickness of the lens element having a reflecting surface.

14. The zoom lens system as claimed in claim 1, satisfying the following conditions (6) and (a):

$$0.1 < M_Y/Y_W \times 10^{-3} < 0.4 \qquad (6)$$

$$Z = f_T/f_W > 2.5 \qquad (a)$$

wherein, $M_Y$ is the amount of movement in the optical axis direction for the lens unit or lens element that moves in a direction perpendicular to the optical axis in zooming from the wide-angle limit to the telephoto limit, $Y_W$ is the amount of movement at the time of maximum blur compensation for the lens unit or lens element that moves in a direction perpendicular to the optical axis, in a focal length $f_W$ of the entire system at the wide-angle limit, $f_W$ is the focal length of the entire zoom lens system at a wide-angle limit, and $f_T$ is the focal length of the entire zoom lens system at a telephoto limit.

15. The zoom lens system as claimed in claim 1, satisfying the following conditions (7) and (a):

$$6.0 < Y_W/I_V \times 10^3 < 9.5 \tag{7}$$

$$Z = f_T/f_W > 2.5 \tag{a}$$

wherein, $Y_W$ is the amount of movement at the time of maximum blur compensation for the lens unit or lens element that moves in a direction perpendicular to the optical axis, in a focal length $f_W$ of the entire system at the wide-angle limit, $I_V$ is a length of the image sensor in the short side direction $$I_V = 2 \times f_W \times \tan \omega_W \times 0.60,$$

$f_W$ is the focal length of the entire zoom lens system at a wide-angle limit, $\omega_W$ is an incident half view angle at the wide-angle limit, and $f_T$ is the focal length of the entire zoom lens system at a telephoto limit.

16. The zoom lens system as claimed in claim 1, satisfying the following conditions (8) and (a):

$$3.0 < P_W/I_V < 11.0 \tag{8}$$

$$Z = f_T/f_W > 2.5 \tag{a}$$

wherein, $P_W$ is the optical axial distance between the reflecting surface and an object side principal point of the lens unit or lens element that moves in a direction perpendicular to the optical axis, at the wide-angle limit, $I_V$ is the length of the image sensor in the short side direction $$I_V = 2 \times f_W \times \tan \omega_W \times 0.60,$$

$f_W$ is the focal length of the entire zoom lens system at a wide-angle limit, $\omega_W$ is the incident half view angle at the wide-angle limit, and $f_T$ is the focal length of the entire zoom lens system at a telephoto limit.

17. The zoom lens system as claimed in claim 1, satisfying the following conditions (9) and (a):

$$0.2 < f_W/H_P < 0.9 \tag{9}$$

$$Z = f_T/f_W > 2.5 \tag{a}$$

wherein, $H_P$ is the optical axial thickness of the lens element having a reflecting surface, $f_W$ is the focal length of the entire zoom lens system at a wide-angle limit, and $f_T$ is the focal length of the entire zoom lens system at a telephoto limit.

18. The zoom lens system as claimed in claim 1, satisfying the following conditions (10) and (a):

$$2.5 < H_P/I_V < 5.0 \tag{10}$$

$$Z = f_T/f_W > 2.5 \tag{a}$$

wherein, $H_P$ is the optical axial thickness of the lens element having a reflecting surface, $I_V$ is the length of the image sensor in the short side direction $$I_V = 2 \times f_W \times \tan \omega_W \times 0.60,$$

$f_W$ is the focal length of the entire zoom lens system at a wide-angle limit, $\omega_W$ is the incident half view angle at the wide-angle limit, and $f_T$ is the focal length of the entire zoom lens system at a telephoto limit.

19. The zoom lens system as claimed in claim 1, wherein in zooming from the wide-angle limit to the telephoto limit at the time of imaging, the first lens unit does not move in the optical axis direction.

20. The zoom lens system as claimed in claim 1, wherein the entirety of the third lens unit moves in a direction perpendicular to the optical axis.

21. The zoom lens system as claimed in claim 1, wherein part of lens elements that constitute the third lens unit move in a direction perpendicular to the optical axis.

22. The zoom lens system as claimed in claim 1, satisfying the following conditions (11) and (a):

$$0.5 < -(1-m_{2T}) \times m_{3T} \times M_{4T} < 2.0 \tag{11}$$

$$Z = f_T/f_W > 2.5 \tag{a}$$

wherein, $m_{2T}$ is a magnification of the second lens unit at the telephoto limit in a case that the shooting distance is infinity, $m_{3T}$ is a magnification of the third lens unit at the telephoto limit in a case that the shooting distance is infinity, $m_{4T}$ is a magnification of the fourth lens unit at the telephoto limit in a case that the shooting distance is infinity, $f_W$ is the focal length of the entire zoom lens system at a wide-angle limit, and $f_T$ is the focal length of the entire zoom lens system at a telephoto limit.

23. The zoom lens system as claimed in claim 1, satisfying the following conditions (12) and (a):

$$1.5 < f_1/f_3 < 3.5 \tag{12}$$

$$Z = f_T/f_W > 2.5 \tag{a}$$

wherein, $f_1$ is the composite focal length of the first lens unit, $f_3$ is a composite focal length of the third lens unit, $f_W$ is the focal length of the entire zoom lens system at a wide-angle limit, and $f_T$ is the focal length of the entire zoom lens system at a telephoto limit.

24. The zoom lens system as claimed in claim 1, satisfying the following conditions (13) and (a):

$$1.0 < -f_1/f_2 < 4.0 \tag{13}$$

$$Z = f_T/f_W > 2.5 \tag{a}$$

wherein, $f_1$ is the composite focal length of the first lens unit, $f_2$ is a composite focal length of the second lens unit, $f_W$ is the focal length of the entire zoom lens system at a wide-angle limit, and $f_T$ is the focal length of the entire zoom lens system at a telephoto limit.

25. An imaging device capable of outputting an optical image of an object as an electric image signal, comprising:

a zoom lens system that forms the optical image of the object; and an image sensor that converts the optical image formed by the zoom lens system into the electric image signal, wherein the zoom lens system, in order from an object side to an image side, comprises:

a first lens unit having positive optical power;

a second lens unit having negative optical power;

a third lens unit having positive optical power; and a fourth lens unit having positive optical power, in which each of the lens units is composed of at least one lens element, an interval between at least any two lens units among the lens units is changed so that the optical image of the object is formed with a continuously variable magnification, the first lens unit includes a lens element having a reflecting surface for bending a light beam from the object, and any one of the lens units, any one of the lens elements, or alternatively a plurality of adjacent lens elements that constitute one lens unit move in a direction perpendicular to an optical axis.

26. A camera for converting an optical image of an object into an electric image signal and then performing at least one of displaying and storing of the converted image signal, comprising:

an imaging device including a zoom lens system that forms the optical image of the object and an image sensor that converts the optical image formed by the zoom lens system into the electric image signal, wherein the zoom lens system, in order from an object side to an image side, comprises:

a first lens unit having positive optical power;

a second lens unit having negative optical power;

a third lens unit having positive optical power; and a fourth lens unit having positive optical power, in which each of the lens units is composed of at least one lens element, an interval between at least any two lens units among the lens units is changed so that the optical image of the object is formed with a continuously variable magnification, the first lens unit includes a lens element having a reflecting surface for bending a light beam from the object, and any one of the lens units, any one of the lens elements, or alternatively a plurality of adjacent lens elements that constitute one lens unit move in a direction perpendicular to an optical axis.

* * * * *